United States Patent
Krishnan et al.

(10) Patent No.: US 11,537,592 B1
(45) Date of Patent: Dec. 27, 2022

(54) METADATA MANAGEMENT THROUGH BLOCKCHAIN TECHNOLOGY

(71) Applicant: Wells Fargo Bank, N.A., San Francisco, CA (US)

(72) Inventors: Gothandapani Krishnan, Bangalore (IN); Sanyam Jain, Udaipur (IN); Vasu Kanna Bhagam, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 243 days.

(21) Appl. No.: 16/390,519

(22) Filed: Apr. 22, 2019

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 6,072,248 | A | 6/2000 | Muise et al. |
| 7,011,164 | B1 | 3/2006 | Breazeale |
| 7,108,178 | B1 | 9/2006 | Choi |
| 9,990,504 | B1 | 6/2018 | Chapman et al. |
| 9,992,028 | B2 | 6/2018 | Androulaki et al. |
| 10,135,607 | B1 | 11/2018 | Roets |
| 2008/0055050 | A1 | 3/2008 | Brown |

(Continued)

FOREIGN PATENT DOCUMENTS

| | | |
|---|---|---|
| GB | 2343264 A | 5/2019 |
| WO | 1998/030421 A1 | 7/1998 |

(Continued)

OTHER PUBLICATIONS

Egelund-Müller et al., Automated Execution of Financial Contracts on Blockchain, [article, online], 2017, [retrieved Dec. 10, 2018<URL: https://link.springer.com/article/10.1007/s12599-017-0507-z>(11 pages).

(Continued)

*Primary Examiner* — Scott A. Waldron
(74) *Attorney, Agent, or Firm* — Womble Bond & Dickinson; Brandon Massengill; David Easwaran

(57) ABSTRACT

Systems, apparatuses, methods, and computer program products are disclosed for providing blockchain-based metadata management. An example method includes receiving an electronic indication of a change in a metadata data structure within a first metadata block stored in a metadata blockchain stored in a blockchain data storage device. The example method may further include determining a set of node devices impacted by the change in the metadata data structure. The example method may further include generating a metadata change consensus notification message. The example method may further comprise transmitting the metadata change consensus notification message to each impacted node device in the set of impacted node devices. Subsequently, the example method may include generating a smart contract in response to receiving a metadata change approval message from each node device impacted by the change in the metadata data structure.

20 Claims, 10 Drawing Sheets

(56) References Cited

U.S. PATENT DOCUMENTS

| | | | |
|---|---|---|---|
| 2011/0214585 | A1 | 9/2011 | Mendoza et al. |
| 2017/0140375 | A1 | 5/2017 | Kunstel |
| 2017/0187535 | A1 | 6/2017 | Middleton et al. |
| 2017/0264428 | A1 | 9/2017 | Seger |
| 2017/0353309 | A1 | 12/2017 | Gray |
| 2018/0018723 | A1 | 1/2018 | Nagla et al. |
| 2018/0218343 | A1 | 8/2018 | Kolb et al. |
| 2018/0309567 | A1 | 10/2018 | Wooden |
| 2018/0341648 | A1 | 11/2018 | Kakavand et al. |
| 2020/0204876 | A1* | 6/2020 | Thompson .............. G06F 16/48 |
| 2020/0250174 | A1* | 8/2020 | Padmanabhan ..... G06F 16/2365 |
| 2020/0287788 | A1* | 9/2020 | Triplet .................. H04L 9/0894 |

FOREIGN PATENT DOCUMENTS

| | | |
|---|---|---|
| WO | 2017/187395 A1 | 2/2017 |
| WO | 2017/145019 A1 | 8/2017 |
| WO | 2018/111295 A1 | 6/2018 |

OTHER PUBLICATIONS

Faisal et al., The Evolution of Embedding Metadata in Blockchain Transactions [article, online], 2018, [retrieved Dec. 10, 2019], <URL:https://arxiv.org/abs/1806.06738> (9 pages).

Gheorghe et al., Blockchain and Smart Contracts in the Music Industry—Streaming vs. Downloading, [article, online] 2017, [retrieved Dec. 10, 2018], retrieved from the Internet <URL: https://search.proquest.com/openview/f39efd295eff3c133edf4e17744cbf36/1?pq-origsite=gscholar&cbl=2032215> (15 pages).

Rajeev Bansal, Cutting to the Chase [article, online], 2005, [retrieved Jul. 23, 2017], URL: <https://www.semanticscholar.org/paper/Cutting-to-the-chase-%5Bmicrowave-car-stopper%5D-Bansal/df16b99e7dc21b0db10837c4eb57cdea77c8fe96> 1 page.

Robert E. Moore, III, Police Pursuits High-Tech Ways to Reduce the Risks, [article, online], 1990, [retrieved Jul. 24, 2017], URL: <https://www.questia.com/magazine/1G1-9177467/police-pursuits-high-tech-ways-to-reduce-the-risks, 3 pages.

* cited by examiner

METADATA MANAGEMENT THROUGH BLOCKCHAIN TECHNOLOGY

TECHNOLOGICAL FIELD

Example embodiments of the present disclosure relate generally to metadata management and, more particularly, to systems and methods for metadata management through blockchain technology.

BACKGROUND

Traditional metadata management systems are directed to managing metadata about other data, such as content data. However, these traditional metadata management systems require complex, computationally intense processes and frequent user interactivity and thus are not able to identify and manage changes in the metadata in an efficient manner.

BRIEF SUMMARY

Computing systems, computing apparatuses, computer-implemented methods, and computer program products are disclosed herein for providing blockchain-based metadata management. The metadata management (MDM) system provided herein solves the above problems by identifying and validating changes in metadata data structures in metadata blocks in metadata blockchain.

In one example embodiment, a computing system is provided for blockchain-based metadata management. The computing system may comprise analysis and reporting circuitry configured to receive an electronic indication of a change in a metadata data structure within a first metadata block stored in a metadata blockchain stored in a blockchain data storage device. The analysis and reporting circuitry may be further configured to determine a set of node devices impacted by the change in the metadata data structure. The analysis and reporting circuitry may be further configured to generate a metadata change consensus notification message. The computing system may further comprise communications circuitry configured to transmit the metadata change consensus notification message to each impacted node device in the set of impacted node devices. The communications circuitry may be further configured to receive a metadata change approval message from each node device impacted by the change in the metadata data structure. The computing system may further comprise governance circuitry configured to generate a smart contract in response to receipt, by the communications circuitry, of the metadata change approval message from each node device impacted by the change in the metadata data structure. The communications circuitry may be further configured to generate, based on the smart contract, a metadata change validation message indicating validity of the change in the metadata data structure. The computing system may further comprise data storage circuitry configured to store the smart contract, the metadata change validation message, or both in a data storage device. The computing system may further comprise blockchain data storage circuitry configured to generate a second metadata block based on the change in the metadata data structure and in response to generation by the governance circuitry of the smart contract and the metadata change validation message. The blockchain data storage circuitry may be further configured to store the second metadata block in the blockchain storage device. The second metadata block may be added to the metadata blockchain by the blockchain data storage circuitry.

In another example embodiment, a computing apparatus is provided for blockchain-based metadata management. The computing apparatus may comprise analysis and reporting circuitry configured to receive an electronic indication of a change in a metadata data structure within a first metadata block stored in a metadata blockchain stored in a blockchain data storage device. The analysis and reporting circuitry may be further configured to determine a set of node devices impacted by the change in the metadata data structure. The analysis and reporting circuitry may be further configured to generate a metadata change consensus notification message. The computing apparatus may further comprise communications circuitry configured to transmit the metadata change consensus notification message to each impacted node device in the set of impacted node devices. The communications circuitry may be further configured to receive a metadata change approval message from each node device impacted by the change in the metadata data structure. The computing apparatus may further comprise governance circuitry configured to generate a smart contract in response to receipt, by the communications circuitry, of the metadata change approval message from each node device impacted by the change in the metadata data structure. The communications circuitry may be further configured to generate, based on the smart contract, a metadata change validation message indicating validity of the change in the metadata data structure. The computing apparatus may further comprise data storage circuitry configured to store the smart contract, the metadata change validation message, or both in a data storage device. The computing apparatus may further comprise blockchain data storage circuitry configured to generate a second metadata block based on the change in the metadata data structure and in response to generation by the governance circuitry of the smart contract and the metadata change validation message. The blockchain data storage circuitry may be further configured to store the second metadata block in the blockchain storage device. The second metadata block may be added to the metadata blockchain by the blockchain data storage circuitry.

In another example embodiment, a computer-implemented method is provided for blockchain-based metadata management. The computer-implemented method may comprise receiving, by analysis and reporting circuitry, an electronic indication of a change in a metadata data structure within a first metadata block stored in a metadata blockchain stored in a blockchain data storage device. The computer-implemented method may further comprise determining, by the analysis and reporting circuitry, a set of node devices impacted by the change in the metadata data structure. The computer-implemented method may further comprise generating, by the analysis and reporting circuitry, a metadata change consensus notification message. The computer-implemented method may further comprise transmitting, by communications circuitry, the metadata change consensus notification message to each impacted node device in the set of impacted node devices. The computer-implemented method may further comprise receiving, by the communications circuitry, a metadata change approval message from each node device impacted by the change in the metadata data structure. The computer-implemented method may further comprise generating, by governance circuitry, a smart contract in response to receiving the metadata change approval message by the communication circuitry from each node device impacted by the change in the metadata data structure. The computer-implemented method may further comprise generating, by the governance circuitry and based on the smart contract, a metadata change validation message indicating validity of the change in the metadata data structure. The computer-implemented method may further comprise storing, by data storage circuitry, the smart contract in a data storage device. The computer-implemented method may further comprise generating, by blockchain data storage circuitry, a second metadata block based on the change in the metadata data structure. The computer-implemented method may further comprise storing, by the blockchain data storage circuitry, the second metadata block in the blockchain storage device. The second metadata block may be added to the metadata blockchain by the blockchain data storage circuitry.

In another example embodiment, a computer program product is provided for blockchain-based metadata management. The computer program product may comprise at least one non-transitory computer-readable storage medium storing computer-executable program code instructions. The computer-executable program code instructions may, when executed by a computing apparatus, cause the computing apparatus to receive, by analysis and reporting circuitry, an electronic indication of a change in a metadata data structure within a first metadata block stored in a metadata blockchain stored in a blockchain data storage device. The computer-executable program code instructions, when executed, may further cause the computing apparatus to determine, by the analysis and reporting circuitry, a set of node devices impacted by the change in the metadata data structure. The computer-executable program code instructions, when executed, may further cause the computing apparatus to generate, by the analysis and reporting circuitry, a metadata change consensus notification message. The computer-executable program code instructions, when executed, may further cause the computing apparatus to transmit, by communications circuitry, the metadata change consensus notification message to each impacted node device in the set of impacted node devices. The computer-executable program code instructions, when executed, may further cause the computing apparatus to receive, by the communications circuitry, a metadata change approval message from each node device impacted by the change in the metadata data structure. The computer-executable program code instructions, when executed, may further cause the computing apparatus to generate, by governance circuitry, a smart contract in response to receipt, by the communications circuitry, of the metadata change approval message from each node device impacted by the change in the metadata data structure. The computer-executable program code instructions, when executed, may further cause the computing apparatus to generate, by the governance circuitry and based on the smart contract, a metadata change validation message indicating validity of the change in the metadata data structure. The computer-executable program code instructions, when executed, may further cause the computing apparatus to store, by data storage circuitry, the smart contract in a data storage device. The computer-executable program code instructions, when executed, may further cause the computing apparatus to generate, by blockchain data storage circuitry, a second metadata block based on the change in the metadata data structure. The computer-executable program code instructions, when executed, may further cause the computing apparatus to store, by the blockchain data storage circuitry, the second metadata block in the blockchain storage device. The second metadata block may be added to the metadata blockchain by the blockchain data storage circuitry.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

DETAILED DESCRIPTION

Figure 1:
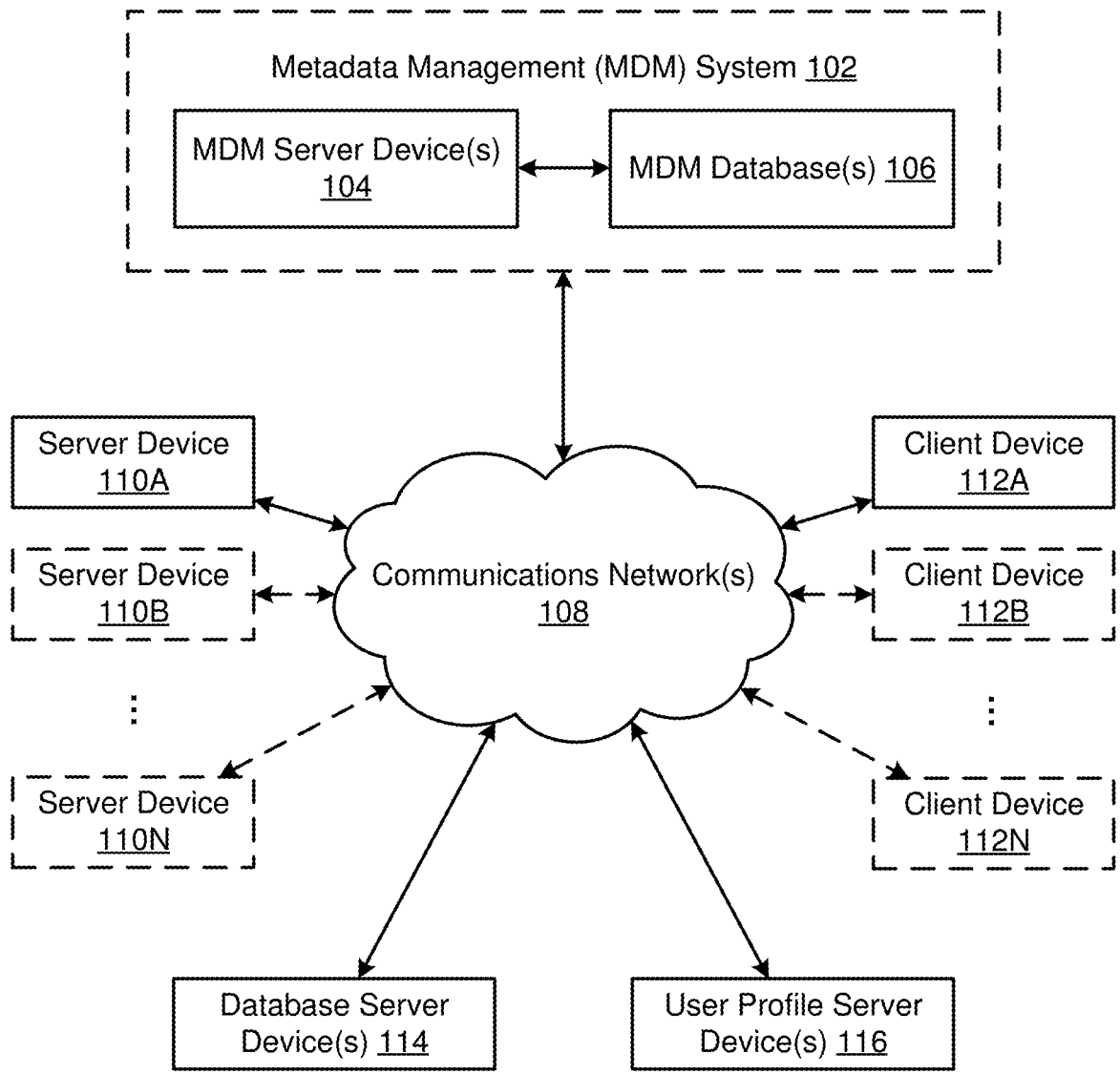
FIG. 1 illustrates a system diagram of a set of devices that may be involved in some example embodiments described herein.

Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide blockchain-based metadata management and monitoring. The blockchain-based metadata management system described herein provides: a prescriptive analytics model; inline rules engines; automatic lineage tracking functionality; and a self-correction and information capturing process.

Traditionally, metadata management presents a number of unique challenges often requiring pointed policies and processes and specialized systems to solve. The blockchain-based metadata management system described herein solves the problems of traditional metadata management by providing hassle free data integrations; tight coupling between the technical, business, and data processes; and global visibility on the end-to-end process. The blockchain-based metadata management system described herein further solves the problems of traditional metadata management by: eliminating metadata repository storage to a larger extent; automatically documenting and discovering the data relationship; and enabling the performance of analytics at the transaction level with the block information. In one example embodiment, the blockchain-based metadata management system described herein particularly solves the problems of traditional metadata management by providing automatic tracking, auditing, and messaging of model definition changes, creations, and updates.

In some embodiments, the present disclosure relates to a metadata management system for providing metadata management and monitoring. In some embodiments, the metadata management system may provide for leveraging the Blockchain to capture the meta data management and thus avoid the gap or tampering of the data in the metadata capturing process; automatic capturing of the meta data information; and tightly coupling the validation between the technical, business and actual data. In some embodiments, the metadata management system may provide for automatic tracking of changes by extending the bitcoin logic into the MDM field (e.g., user defined application programming interface (API) to capture the change and communicate to the core system); open source file storage for the metadata data management storage (e.g., hybrid architecture comprising data storage and blockchain data storage to provide data capturing functionalities); and automatic messaging and audit tracking to capture the business and technical metadata management with an option to link to the underlying data.

In some embodiments, the metadata management system may provide for prescriptive analytic models. For example, the blockchain architecture disclosed herein enables use of the block defined in the blockchain component and integration of the prescriptive analytical algorithms inside the blocks (e.g., leveraging the existing model, and altering the model at the transaction level). In some embodiments, the metadata management system may provide for automatic lineage tracking. For example, the blockchain architecture disclosed herein: ensures that the lineage of the transaction block is secure and non-erasable; leverages this feature through a routine to capture the metadata lineage and cross link across the business group and enterprise reporting; and thus eliminates the manual tracking and manipulation of data. In some embodiments, the metadata management system may provide for an inline rule engine. For example, since the information may not be stored in the block level, the inline rule engine may be provided as part of the blockchain storage mechanism to integrate business rules along with operation, data, and technical rules, which may be embossed in the block itself. In some embodiments, the metadata management system may provide for self-correction and information capturing that: enables block storage in the blockchain and performance of the data quality correction at the source (e.g., correction at the source of origin); facilitates business functionality-based linkage of the blocks; and implements capturing of the required data for modeling.

In some embodiments, the present disclosure relates to a metadata management system configured to provide a technology-based solution for the facilitation of metadata management through the use of blockchain. In some instances, effective metadata management involves establishing policies and processes that ensure information can be integrated, accessed, shared, linked, analyzed and maintained to best effect across an organization. In some embodiments, the metadata management system disclosed herein is directed to (i) automatic tracking, auditing, and messaging of model definition changes, creations and updates, (ii) processes to capture and communicate the changes to all upstream, downstream, and external interfaces and to each of the impacted systems stored in the system BC-MDM environment, (iii) a hybrid model architecture combining traditional data lineage storage and blockchain storage, and (iv) a validation and verification process configured for lineage linking of business, technical and actual data. In some embodiments, an example method performed by the metadata management system disclosed herein may include the reception of a change in metadata (e.g., from a consumer or extracted from a database), communication of the change to all impacted parties, reception of approval from all impacted parties, invocation of smart contract to validate and verify the change, and storage to both a data storage and a blockchain, leaving a permanent record of the change.

There are many advantages of these and other embodiments described herein, such as: facilitating metadata management through the use of blockchain; facilitating a faster, cheaper, and less computing resource and data intensive process for providing metadata management and monitoring; providing a new way to capture and maintain the metadata management process that is highly interactive between the business, technical, and operational layers; facilitating automation in motion for the metadata change management system; facilitating automatic tracking, auditing, and messaging of model definitions changes, creations and updates (e.g., data changes to the model); providing techniques to capture and communicate the changes to upstream, downstream, and external interfaces and all the impacted systems stored in the system blockchain-based metadata management environment (e.g., mapping the external and internal stakeholders and processes); providing a unique way to store the data and their relationship without any deletion or tampering of the data (e.g., history is never changed); providing a hybrid model architecture by combing the traditional data lineage store and blockchain storage; facilitating the lineage linking and coupling of business, technical, and data (e.g., actual data) together with tight validation and verification (e.g., governance); facilitating self-tracking of metadata information through blockchain future; providing for analytics and business rules embedded into the blockchain blocks to enable quality alerts at the source; providing a solution to link business, technical, and operational data linking by leverage blockchain functionality into the technical features; providing a new way to capture the metadata information (e.g., traditional and modern data sources and stores plus blockchain functionality); facilitating the definition of standards on business and technical data validations across enterprises; facilitating inline metadata connection to maintain the current lineage and the older links (e.g., leveraging blockchain so that the lineages cannot be updated or altered).

Among other features, these and other embodiments described herein at least: reflect improvements in the functioning of computing systems or devices, such as metadata management systems (including but not limited to metadata management server devices and databases), server devices, client devices, and combinations thereof; reflect improvements to other technologies or technical fields as described herein (e.g., master data management); and effect transformations or reductions of particular articles to different states or things, such as metadata data structures, metadata blocks, metadata blockchains, other articles described herein, and combinations thereof.

Definitions

As used herein, the terms "data," "data structure," "content," "information," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and similar terms should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

The term "set" refers to a collection of zero or more elements. For example, a set may refer to a data structure having zero or more data elements.

The term "metadata data structure" refers to a data structure associated with metadata included in a metadata block in a metadata blockchain. For example, a metadata data structure may refer to a model definition data structure, a metadata block header data structure, a technical metadata data structure, a business metadata data structure, an operational metadata data structure, a next metadata block information data structure, any other suitable electronic information or data structure associated therewith (including, but not limited to, links or pointers), or any combination thereof. A "metadata block header data structure" may refer to a current metadata block hash value data structure, a previous metadata block hash value data structure, a next metadata block hash value data structure, a merkle root hash value data structure, a nonce value data structure, any other suitable electronic information or data structure associated therewith (including, but not limited to, links or pointers), or any combination thereof.

The term "metadata block" refers to a data structure associated with a block in a metadata blockchain. For example, a metadata block may comprise a model definition data structure, a metadata block header data structure, a technical metadata data structure, a business metadata data structure, an operational metadata data structure, a next metadata block information data structure, any other suitable electronic information or data structure associated therewith (including, but not limited to, links or pointers), or any combination thereof. A metadata block header data structure may comprise a current metadata block hash value data structure, a previous metadata block hash value data structure, a next metadata block hash value data structure, a merkle root hash value data structure, a nonce value data structure, any other suitable electronic information or data structure associated therewith (including, but not limited to, links or pointers), or any combination thereof.

The term "metadata blockchain" refers to a blockchain of metadata blocks. For example, a metadata blockchain may comprise a plurality of metadata blocks, any other suitable electronic information or data structure associated therewith (including, but not limited to, links or pointers), or any combination thereof.

The term "electronic indication of a change in a metadata data structure" refers to an electronic indication of a change in a metadata data structure within a metadata block stored in a metadata blockchain. For example, a change in a metadata data structure may comprise a change in any data within a metadata block, a change in a model definition within a metadata block, an addition of a model definition to a metadata block, a change in a technical metadata data structure within a metadata block, a change in a business metadata data structure within a metadata block, a change in an operational metadata data structure within a metadata block, any other suitable change, or any combination thereof. In some embodiments, the electronic indication of the change in the metadata data structure may be a data structure. For example, an API may be attached to all the source structure; an automatic trigger may be performed only when there is a change to a design structure or definition of the models; and messages may be sent to the server mapped with the initial structures.

The term "node device" refers to a computing device, such as a server device, client device, a database server device, a data storage device, or a blockchain data storage device that stores one or more portions of a metadata blockchain. For example, a node device may comprise a server device, a client device, a database, a database server device, any other suitable device or data structure associated therewith (including, but not limited to, links or pointers), or any combination thereof.

The term "impacted node device" or "node device impacted by a change in a metadata data structure" refers to a node device that is impacted by a change within a metadata data structure stored in a metadata block in a metadata blockchain. For example, an impacted node device may be a node device that stores one or more portions of a metadata blockchain comprising a metadata block that includes at least one changed metadata data structure.

The term "metadata change consensus notification message" refers to a data structure associated with a notification of a change in metadata. For example, a metadata change approval message may comprise a notification or alert of a change in a metadata data structure within a metadata block stored in a metadata blockchain. In some embodiments, the blockchain-based metadata management system disclosed herein may transmit a metadata change consensus notification message to all parties involved (e.g., all of the impacted node devices). In some embodiments, a metadata change consensus notification message may further comprise a request for an approval of the change in the metadata data structure.

The term "metadata change approval message" refers to a data structure associated with an approval of a change in metadata. For example, a metadata change approval message may comprise an approval of a change within a metadata data structure stored in a metadata block in a metadata blockchain. In some embodiments, the blockchain-based metadata management system disclosed herein may receive a metadata change approval message from some or all parties involved (e.g., some or all of the impacted node devices).

The term "smart contract" refers to any code usable to perform changes in a blockchain or to carry some process in the blockchain. The structure of the smart contract may be any structure (e.g., structure liberty). For example, a smart contract may comprise one or more blockchain-based data structures that digitally facilitate, verify, or enforce the negotiation or performance of a contract.

The term "metadata change validation message" refers to a data structure associated with a validation of a change in metadata. For example, a metadata change validation message may comprise a validation of a change within a metadata data structure stored in a metadata block in a metadata blockchain. In another example, a metadata change validation message may be a receipt produced to indicate that: (1) a metadata change approval message has been received from all parties involved (e.g., all of the impacted node devices); (2) checks on the database side are performed to verify the changes; (3) a confirmation has been made that the requested changes have been performed on the database side with all of the parties involved; (4) any other suitable actions are performed; or any combination thereof. In some embodiments, the blockchain-based metadata management system disclosed herein may generate a metadata change validation message after receiving a metadata change approval message from all parties involved (e.g., all of the impacted node devices), performing checks on the database side to verify the changes, confirming that the requested changes have been performed on the database side with all of the parties involved, performing any other suitable actions, or any combination thereof. In some embodiments, the blockchain-based metadata management system disclosed herein may store the generated metadata change validation message in a data storage device or blockchain data storage device for use in performing the various functionality disclosed herein. In some embodiments, the blockchain-based metadata management system disclosed herein may transmit the generated metadata change validation message to circuitry for use in performing the various functionality disclosed herein.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more server devices, client devices, remote devices, or a combination thereof. Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide metadata management and monitoring. As illustrated, a metadata management system 102 may be connected to one or more metadata management server devices 104 in communication with one or more metadata management databases 106. The metadata management system 102 may be connected to one or more server devices 110A-110N, one or more client devices 112A-112N, one or more database server devices 114, and one or more user profile server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the metadata management system 102 may be configured to provide metadata management and monitor changes therein as described in further detail below.

The metadata management system 102 may be embodied as one or more specialized circuitries, computers, or computing systems and may comprise one or more metadata management server devices 104 and one or more metadata management databases 106. The one or more metadata management server devices 104 may be embodied as one or more servers, remote servers, cloud-based servers (e.g., cloud utilities), processors, any other suitable server devices, or any combination thereof. The one or more metadata management server devices 104 are configured to receive, process, generate, and transmit data, signals, and electronic information to facilitate the operations of the metadata management system 102. The one or more metadata management databases 106 may be embodied as one or more data storage devices, such as Network Attached Storage (NAS) devices or separate databases or servers. The one or more metadata management databases 106 are configured to store and provide access to data and information used by the metadata management system 102 to facilitate the operations of the metadata management system 102. For example, the one or more metadata management databases 106 may store user account credentials for users of one or more server devices 110A-110N, one or more client devices 112A-112N, one or more database server devices 114, one or more user profile server devices 116, or a combination thereof. In another example, the one or more metadata management databases 106 may store data regarding device characteristics for the one or more server devices 110A-110N, one or more client devices 112A-112N, one or more database server devices 114, one or more user profile server devices 116, or a combination thereof. In some embodiments, the one or more client devices 112A-112N may be associated with one or more users. In some embodiments, one or more metadata management server devices 104, the one or more metadata management databases 106, or both may include or store various data and electronic information associated with one or more metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. For example, the one or more server devices 110A-110N may be blockchain servers. In some embodiments, the one or more server devices 110A-110N may receive, process, generate, and transmit data, signals, and electronic information to facilitate the operations of the metadata management system 102. Information received by the metadata management system 102 from one or more server devices 110A-110N may be provided in various forms and via various methods. In some embodiments, the one or more server devices 110A-110N may include or store various data and electronic information associated with one or more metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, or combinations thereof.

The one or more client devices 112A-112N may be embodied by one or more computing devices. Information received by the metadata management system 102 from the one or more client devices 112A-112N may be provided in various forms and via various methods. For example, the one or more client devices 112A-112N may be smartphones, laptop computers, netbooks, tablet computers, wearable devices, desktop computers, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may be associated with one or more users. In some embodiments, the one or more client devices 112A-112N may include or store various data and electronic information associated with one or more metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, or combinations thereof.

In embodiments where a client device 112 is a mobile device, such as a smartphone or tablet, the mobile device may execute an "app" (e.g., a thin-client application) to interact with the metadata management system 102, one or more server devices 110A-110N, one or more database server devices 114, one or more user profile server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, user profile server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the metadata management system 102. Information received by the metadata management system 102 from one or more database server devices 114 may be provided in various forms and via various methods. It will be understood, however, that in some embodiments, the one or more database server devices 114 need not themselves be databases or database servers, but may be peripheral devices communicatively coupled to databases or database servers.

In some embodiments, the one or more database server devices 114 may include or store various data and electronic information associated with one or more metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, or combinations thereof.

The one or more user profile server devices 116 may be embodied by one or more computing devices, server devices, servers, data storage devices, databases, or a combination thereof. In some embodiments, the one or more user profile server devices 116 may be embodied as one or more data storage devices, such as one or more NAS devices, or as one or more separate databases or database servers. In some embodiments, the one or more user profile server devices 116 may be embodied as one or more servers, remote servers, cloud-based servers (e.g., cloud utilities), processors, or any other suitable devices, or any combination thereof. In some embodiments, the one or more user profile server devices 116 may receive, process, generate, and transmit data, signals, and electronic information to facilitate the operations of the metadata management system 102. Information received by the metadata management system 102 from one or more user profile server devices 116 may be provided in various forms and via various methods. It will be understood, however, that in some embodiments, the one or more user profile server devices 116 need not themselves be databases or database servers, but may be peripheral devices communicatively coupled to databases or database servers.

In some embodiments, the one or more user profile server devices 116 may include or store various data and electronic information associated with one or more users. In some embodiments, the one or more user profile server devices 116 may include or store user profile data structures comprising user profile information associated with one or more users of the one or more client devices 112A-112N. In one illustrative example, a user profile server device 116 may receive a request for user profile information associated with a user of the client device 112A from the metadata management system 102 over the one or more communications networks 108; generate a user profile data structure comprising the user profile information; and transmit, to the metadata management system 102 over the one or more communications networks 108, the user profile data structure comprising the user profile information. In some embodiments, the user profile data structures may further comprise, or be stored in association with (e.g., via links or pointers), one or more metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, or combinations thereof. In another illustrative example, a user profile server device 116 may receive a request for electronic information, data, or data structures associated with a user of the client device 112A from the metadata management system 102 over the one or more communications networks 108; generate a data structure comprising the requested electronic information, data, or data structures; and transmit, to the metadata management system 102 over the one or more communications networks 108, the data structure.

Additionally or alternatively, the one or more server devices 110A-110N, the one or more client devices 112A-112N, the one or more database server devices 114, the one or more user profile server devices 116, or any combination thereof may interact with the metadata management system 102 over one or more communications networks 108. As yet another example, the one or more server devices 110A-110N, the one or more client devices 112A-112N, the one or more database server devices 114, the one or more user profile server devices 116, or a combination thereof may include various hardware or firmware designed to interface with the metadata management system 102. For example, an example server device 110A may be a session authentication server modified to communicate with the metadata management system 102, and another example server device 110B may be a purpose-built session authentication server offered for the primary purpose of communicating with the metadata management system 102. As another example, an example client device 112A may be a user's smartphone and may have an application stored thereon facilitating communication with the metadata management system 102, whereas another example client device 112B may be a purpose-built device (e.g., a blockchain-based metadata management database server) offered for the primary purpose of communicating with the metadata management system 102.

As a foundation for some embodiments, the metadata management system 102 may provide for receiving an electronic indication of a change within a metadata data structure stored in a first metadata block in a metadata blockchain stored in a blockchain data storage device. In some embodiments, the metadata management system 102 may provide for receiving, directly or indirectly via communications network 108, the electronic indication of the change in the metadata data structure from a node device. The node device may be, for example, one of the one or more client devices 112A-112N, one of the one or more server devices 110A-110N, one of the one or more metadata management server devices 104, one of the one or more database server devices 114, one of the one or more metadata management databases 106, any other suitable device, or any combination thereof. In some embodiments, the metadata management system 102 may provide for extracting, directly or indirectly via communications network 108, the electronic indication of the change in the metadata data structure from a blockchain data storage device. The blockchain data storage device may be, for example, one or more of the one or more database server devices 114, the one or more metadata management databases 106, a node device, or a combination thereof.

In some embodiments, the metadata management system 102 may provide for determining a set of node devices impacted by the change in the metadata data structure. In one illustrative example, the set of node devices may consist of client device 112A, client device 112B, server device 110A, and server device 110B, and the metadata management system 102 may determine that the set of impacted node devices consists of client device 112A and server device 110B.

In some embodiments, the metadata management system 102 may provide for generating a metadata change consensus notification message. In some embodiments, the metadata management system 102 may provide for transmitting, directly or indirectly via communications network 108, the metadata change consensus notification message to each impacted node device in the set of impacted node devices. In some embodiments, the metadata management system 102 may provide for receiving, directly or indirectly via communications network 108, a metadata change approval message from each node device impacted by the change in the metadata data structure.

In some embodiments, the metadata management system 102 may provide for generating a smart contract in response to receiving the metadata change approval message by the communication circuitry from each node device impacted by the change in the metadata data structure. In some embodiments, the metadata management system 102 may provide for generating, based on the smart contract, a metadata change validation message indicating validity of the change in the metadata data structure. In some embodiments, the metadata management system 102 may provide for storing the smart contract, the metadata change validation message, or both in a data storage device. The data storage device may be, for example, one or more of the one or more database server devices 114, the one or more metadata management databases 106, a node device, or a combination thereof.

In some embodiments, the metadata management system 102 may provide for generating a second metadata block based on the change in the metadata data structure in response to generating the smart contract and the metadata change validation message. In some embodiments, the metadata management system 102 may provide for storing the second metadata block in the blockchain storage device. For example, the metadata management system 102 may provide for adding the second metadata block to the metadata blockchain.

Example Implementing Apparatus

Figure 2:
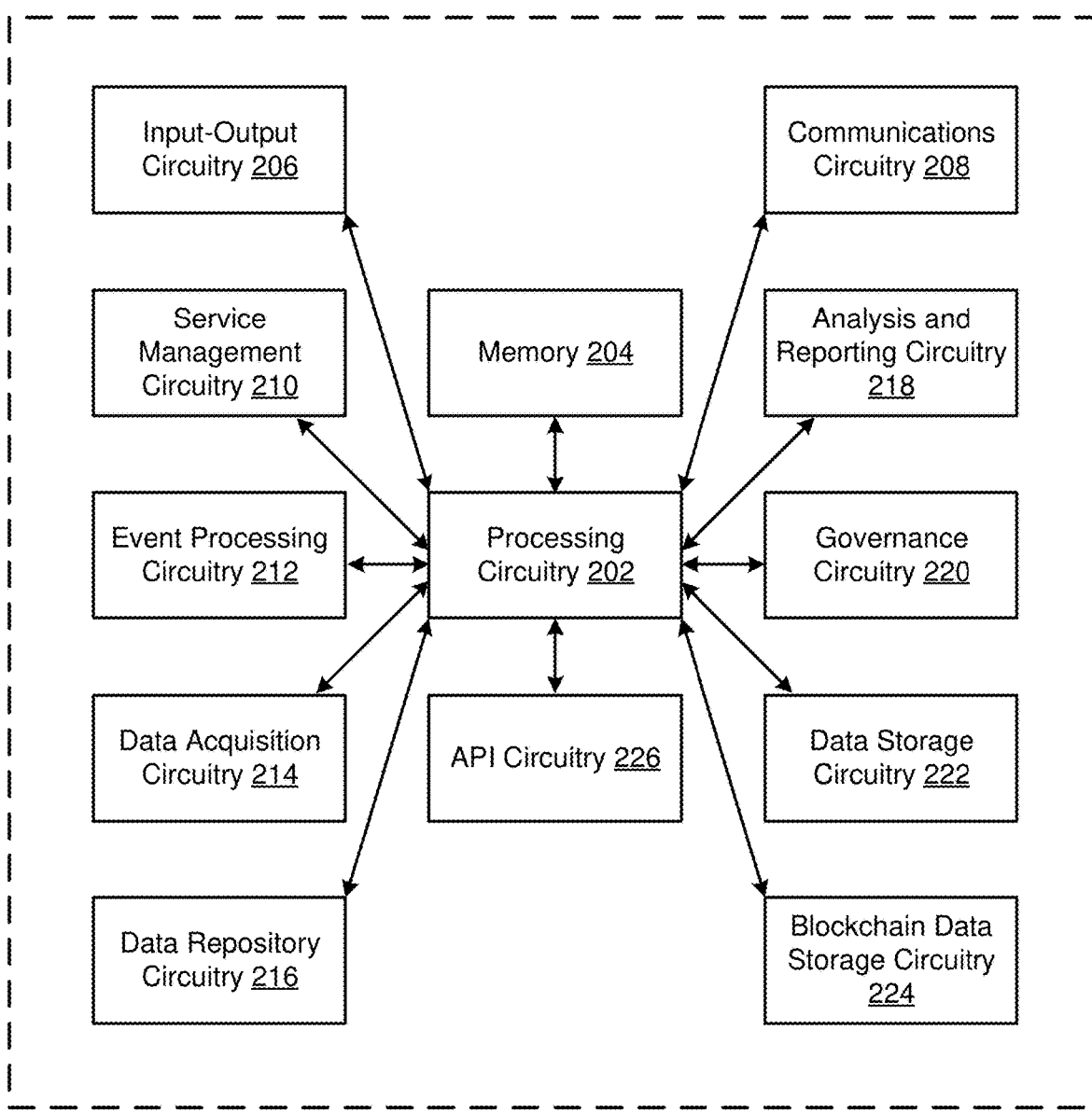
FIG. 2 illustrates a schematic block diagram of example circuitry that may perform various operations in accordance with some example embodiments described herein.

The metadata management system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, service management circuitry 210, event processing circuitry 212, data acquisition circuitry 214, data repository circuitry 216, analysis and reporting circuitry 218, governance circuitry 220, data storage circuitry 222, blockchain data storage circuitry 224, and application programming interface (API) circuitry 226. The apparatus 200 may be configured to execute the operations described above with respect to FIG. 1 and below with respect to FIGS. 3-6. Although some of these components 202-226 are described with respect to their functional capabilities, it should be understood that the particular implementations necessarily include the use of particular hardware to implement such functional capabilities. It should also be understood that certain of these components 202-226 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

In some instances, the memory 204 may be configured to store data, data structures, and electronic information associated with one or more metadata data structures, metadata blocks, metadata blockchains, electronic indications of changes in metadata data structures in metadata blocks in metadata blockchains, and combinations thereof. In some instances, the memory 204 may be configured to store data, data structures, and electronic information associated with one or more node devices, impacted node devices, and combinations thereof, such as one or more identifiers, links, addresses, or pointers to sets of node devices and impacted node devices. In some embodiments, a set of impacted node devices may be a subset of a set of node devices that is impacted by a change in a metadata data structure within a metadata block stored in a metadata blockchain. In some instances, the memory 204 may be configured to store data, data structures, and electronic information associated with one or more metadata change consensus notification messages, metadata change approval messages, smart contracts, metadata change validation messages, and combinations thereof. In some instances, the memory 204 may be configured to store data, data structures, and electronic information associated with one or more control signals. For example, the memory 204 may be configured to store a control signal configured to cause the communications circuitry 208 to transmit a metadata change consensus notification message to each impacted node device in a set of impacted node devices. In some instances, the memory 204 may be configured to store data, data structures, and electronic information associated with one or more cryptographic hash techniques, cryptographic hash algorithms, and combinations thereof. For example, the memory 204 may be configured to store a cryptographic hash technique that uses a cryptographic hash algorithm such as a Secure Hash Algorithm (SHA) cryptographic hash algorithm (e.g., SHA-256, SHA-512). It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate (e.g., by user interface circuitry included in the apparatus 200) user interface data for display by one or more other devices with which one or more users directly interact and transmit the generated user interface data to one or more of those devices.

In some embodiments, the apparatus may include user interface circuitry that includes hardware components designed or configured to generate user interface data configured to be displayed by a display device. For example, the user interface circuitry may be configured to generate user interface data and transmit the generated user interface data to the input-output circuitry 206, and the input-output circuitry 206 may be configured to receive the user interface data and display the received user interface data on one or more display screens. In some embodiments, the user interface circuitry may include hardware components designed or configured to generate the user interface data based on one or more portions of the metadata, metadata data structures, metadata blocks, metadata blockchains, electronic indications of changes in metadata data structures in metadata blocks in metadata blockchains, sets of node devices, sets of impacted node devices, metadata change consensus notification messages, metadata change approval messages, smart contracts, metadata change validation messages, any other suitable data, data structures, or electronic information, or any combination thereof. For instance, the user interface circuitry may include hardware components designed or configured to generate user interface data based on any embodiment or combination of embodiments described with reference to FIGS. 1-7.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols. In some embodiments, the communications circuitry 208 may be configured to transmit a metadata change consensus notification message to each impacted node device in the set of impacted node devices. In some embodiments, the communications circuitry 208 may be configured to receive a metadata change approval message from each node device impacted by the change in the metadata data structure.

The service management circuitry 210 includes hardware components designed or configured to request, receive, process, generate, and transmit data, data structures, control signals, and electronic information for use in blockchain-based metadata management. In some embodiments, the service management circuitry 210 may be configured to provide portfolio management, operations management, any other suitable functionality, or any combination thereof.

The event processing circuitry 212 includes hardware components designed or configured to request, receive, process, generate, and transmit data, data structures, control signals, and electronic information for use in blockchain-based metadata management. In some embodiments, the event processing circuitry 212 may be configured to provide complex event processing, a rules engine, service-oriented architecture (SOA) services, applications, any other suitable functionality, or any combination thereof.

The data acquisition circuitry 214 includes hardware components designed or configured to request, receive, process, generate, and transmit data, data structures, control signals, and electronic information for use in blockchain-based metadata management. In some embodiments, the data acquisition circuitry 214 may be configured to provide: structured data; semi-structured data; unstructured data; data capture; data transformation; master data; derivation of metadata and index; match and combine; population of repositories; any other suitable functionality; or any combination thereof.

The data repository circuitry 216 includes hardware components designed or configured to request, receive, process, generate, store, and transmit data, data structures, control signals, and electronic information for use in blockchain-based metadata management. In some embodiments, the data repository circuitry 216 may be configured to provide: a relational database management system (DBMS) data warehouse; a first non-relational DBMS (e.g., Hadoop distributed file system (HDFS), Hbase); a second non-relational DBMS (e.g., content management systems); data visualization; a data mart (e.g., online analytical processing (OLAP) cube); a real-time analytical relational DBMS (RDBMS); any other suitable functionality; or any combination thereof.

The analysis and reporting circuitry 218 includes hardware components designed or configured to request, receive, process, generate, and transmit data, data structures, control signals, and electronic information for use in blockchain-based metadata management. In some embodiments, the analysis and reporting circuitry 218 may be configured to provide: a rules generator; a data mining engine; a structured query language (SQL) analytics engine; a search engine; a NoSQL (e.g., MapReduce) engine; visualization; static and OLAP reports; dashboards and alerts; statistical analysis; predictive analysis; any other suitable functionality; or any combination thereof.

In some embodiments, the analysis and reporting circuitry 218 may be configured to receive an electronic indication of a change in a metadata data structure within a first metadata block stored in a metadata blockchain stored in a blockchain data storage device (e.g., memory 204, one or more of the one or more database server devices 114, the one or more metadata management databases 106, a node device, or a combination thereof). In some embodiments, the blockchain data storage device may be a decentralized storage device, such as a cloud storage device. In some embodiments, the change in the metadata data structure may comprise a change in any data in the first metadata block, a change in a model definition in the first metadata block, an addition of a model definition to the first metadata block, a change in a technical metadata data structure in the first metadata block, a change in a business metadata data structure in the first metadata block, a change in an operational metadata data structure in the first metadata block, any other suitable change, or any combination thereof. In some embodiments, the electronic indication of the change in the metadata data structure may be a data structure.

In some embodiments, the analysis and reporting circuitry 218 may be configured to receive, directly or indirectly, the electronic indication of the change in the metadata data structure from a node device. The node device may be, for example, a client device (e.g., one of the one or more client devices 112A-112N), a server device (e.g., one of the one or more server devices 110A-110N, one of the one or more metadata management server devices 104), a database server device (e.g., one of the one or more database server devices 114, one of the one or more metadata management databases 106), any other suitable device, or any combination thereof. In some embodiments, the analysis and reporting circuitry 218 may be configured to extract, directly or indirectly, the electronic indication of the change in the metadata data structure from a data storage device (e.g., memory 2014, one or more of the one or more database server devices 114, the one or more metadata management databases 106, a node device, or a combination thereof). In some embodiments, the analysis and reporting circuitry 218 may be configured to automatically track the metadata data structure in real-time and without user interactivity; automatically identify the change in the metadata data structure in real-time and without user interactivity; and generate the electronic indication of the change in the metadata data structure in real-time and without user interactivity.

In some embodiments, the analysis and reporting circuitry 218 may be configured to determine a set of node devices impacted by the change in the metadata data structure. In some embodiments, the analysis and reporting circuitry 218 may be configured to identify electronic information associated with each node device in the set of impacted node devices, such as one or more identifiers, links, addresses, or pointers to each node device in the set of impacted node devices. In some embodiments, the set of impacted node devices may be a subset of the set of node devices that is impacted by the change in the metadata data structure in the metadata block in the metadata blockchain. In some embodiments, the set of node devices may comprise one or more client devices (e.g., one or more of the one or more client devices 112A-112N), server devices (e.g., one or more of the one or more server devices 110A-110N, one or more of the one or more metadata management server devices 104), database server devices (e.g., one or more of the one or more database server devices 114, one or more of the one or more metadata management databases 106), any other suitable devices, or any combination thereof. In one illustrative example, the set of node devices may consist of client device 112A, client device 112B, server device 110A, and server device 110B, and the analysis and reporting circuitry 218 may determine that the set of impacted node devices consists of client device 112A and server device 110B.

In some embodiments, the analysis and reporting circuitry 218 may be further configured to generate a metadata change consensus notification message. In some embodiments, the analysis and reporting circuitry 218 may be configured to determine the set of impacted node devices in real-time and without user interactivity; and generate the metadata change consensus notification message in real-time and without user interactivity. In some embodiments, the analysis and reporting circuitry 218 may be configured to generate, in real-time and without user interactivity, a control signal configured to cause the communications circuitry 208 to transmit the metadata change consensus notification message to each impacted node device in the set of impacted node devices.

The governance circuitry 220 includes hardware components designed or configured to request, receive, process, generate, and transmit data, data structures, control signals, and electronic information for use in blockchain-based metadata management. In some embodiments, the governance circuitry 220 may be configured to provide: data governance; data audit, balance, and control; any other suitable functionality; or any combination thereof.

In some embodiments, the governance circuitry 220 may be configured to generate a smart contract in response to receipt, by the communications circuitry of the metadata change approval message from each node device impacted by the change in the metadata data structure. In some embodiments, the governance circuitry 220 may be configured to generate, based on the smart contract, a metadata change validation message indicating validity of the change in the metadata data structure. In some embodiments, the governance circuitry 220 may be configured to generate the smart contract in real-time and without user interactivity. In some embodiments, the governance circuitry 220 may be configured to generate the metadata change validation message based on the smart contract in real-time and without user interactivity.

The data storage circuitry 222 includes hardware components designed or configured to request, receive, process, generate, store, and transmit data, data structures, control signals, and electronic information for use in blockchain-based metadata management. In some embodiments, the data storage circuitry 222 may be configured to store the smart contract, the metadata change validation message, or both in a data storage device (e.g., memory 204, one or more of the one or more database server devices 114, the one or more metadata management databases 106, a node device, or a combination thereof). In some embodiments, the data storage device may be a decentralized storage device, such as a cloud storage device. In some embodiments, the data storage circuitry 222 may be configured to store the smart contract, the metadata change validation message, or both in the data storage device in real-time and without user interactivity.

The blockchain data storage circuitry 224 includes hardware components designed or configured to request, receive, process, generate, store, and transmit data, data structures, control signals, and electronic information for use in blockchain-based metadata management. In some embodiments, the blockchain data storage circuitry 224 may be configured to generate a second metadata block based on the change in the metadata data structure and in response to generation by the governance circuitry 220 of the smart contract and the metadata change validation message. In some embodiments, the blockchain data storage circuitry 224 may be configured to store the second metadata block in the blockchain storage device. In some embodiments, the blockchain data storage circuitry 224 may be configured to store the second metadata block in the blockchain storage device by adding the second metadata block to the metadata blockchain. For example, the second metadata block may be added to the metadata blockchain by the blockchain data storage circuitry 224. In some embodiments, the blockchain data storage circuitry 224 may be configured to: generate the second metadata block without user interactivity; and store the second metadata block in the blockchain storage device in real-time and without user interactivity. In some embodiments, the blockchain data storage circuitry may be configured to generate the second metadata block based on a cryptographic hash technique. In some embodiments, the cryptographic hash technique may be configured to use a cryptographic hash algorithm, such as a SHA cryptographic hash algorithm (e.g., SHA-256, SHA-512).

The API circuitry 226 includes hardware components designed or configured to request, receive, process, generate, and transmit data, data structures, control signals, and electronic information for use in blockchain-based metadata management. In some embodiments, the API circuitry 226 may be in communication, via communications circuitry 208, with a computing device (e.g., a node device, one or more server devices 110, one or more client devices 112, one or more database server devices 114, one or more user profile server devices 116, any other suitable computing device or circuitry, or a combination thereof) and thus configured to receive data, data structures, requests, queries, control signals, messages, smart contracts, and electronic information from the computing device and transmit data, data structures, requests, queries, control signals, messages, smart contracts, and electronic information to the computing device.

It should also be appreciated that, in some embodiments, each of the service management circuitry 210, event processing circuitry 212, data acquisition circuitry 214, data repository circuitry 216, analysis and reporting circuitry 218, governance circuitry 220, data storage circuitry 222, blockchain data storage circuitry 224, and API circuitry 226 may include a separate processor, specially configured field programmable gate array (FPGA), application specific interface circuit (ASIC), or cloud utility to perform the above functions.

In some embodiments, the hardware components described above with reference to service management circuitry 210, event processing circuitry 212, data acquisition circuitry 214, data repository circuitry 216, analysis and reporting circuitry 218, governance circuitry 220, data storage circuitry 222, blockchain data storage circuitry 224, and API circuitry 226, may, for instance, utilize communications circuitry 208 or any suitable wired or wireless communications path to communicate with a node device, a server device (e.g., one or more of server devices 110A-110N), a client device (e.g., one or more of client devices 112A-112N), a database server device (e.g., one or more of database server devices 114), a user profile server device (e.g., one or more of user profile server devices 116), processing circuitry 202, memory 204, input-output circuitry 206, communications circuitry 208 (e.g., the communications circuitry 208 of a second apparatus implementing one or more portions of apparatus 200), each other, or any other suitable circuitry or device.

In some embodiments, one or more of the service management circuitry 210, event processing circuitry 212, data acquisition circuitry 214, data repository circuitry 216, analysis and reporting circuitry 218, governance circuitry 220, data storage circuitry 222, blockchain data storage circuitry 224, and API circuitry 226 may be hosted locally by the apparatus 200. In some embodiments, one or more of the service management circuitry 210, event processing circuitry 212, data acquisition circuitry 214, data repository circuitry 216, analysis and reporting circuitry 218, governance circuitry 220, data storage circuitry 222, blockchain data storage circuitry 224, and API circuitry 226 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via a networked connection configured to transmit and receive data and electronic information between the apparatus 200 and the third party circuitries. In turn, the apparatus 200 may be in remote communication with one or more of the service management circuitry 210, event processing circuitry 212, data acquisition circuitry 214, data repository circuitry 216, analysis and reporting circuitry 218, governance circuitry 220, data storage circuitry 222, blockchain data storage circuitry 224, and API circuitry 226.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-executable program code instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more user profile server devices 116 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the metadata management system described herein.

Figure 3:
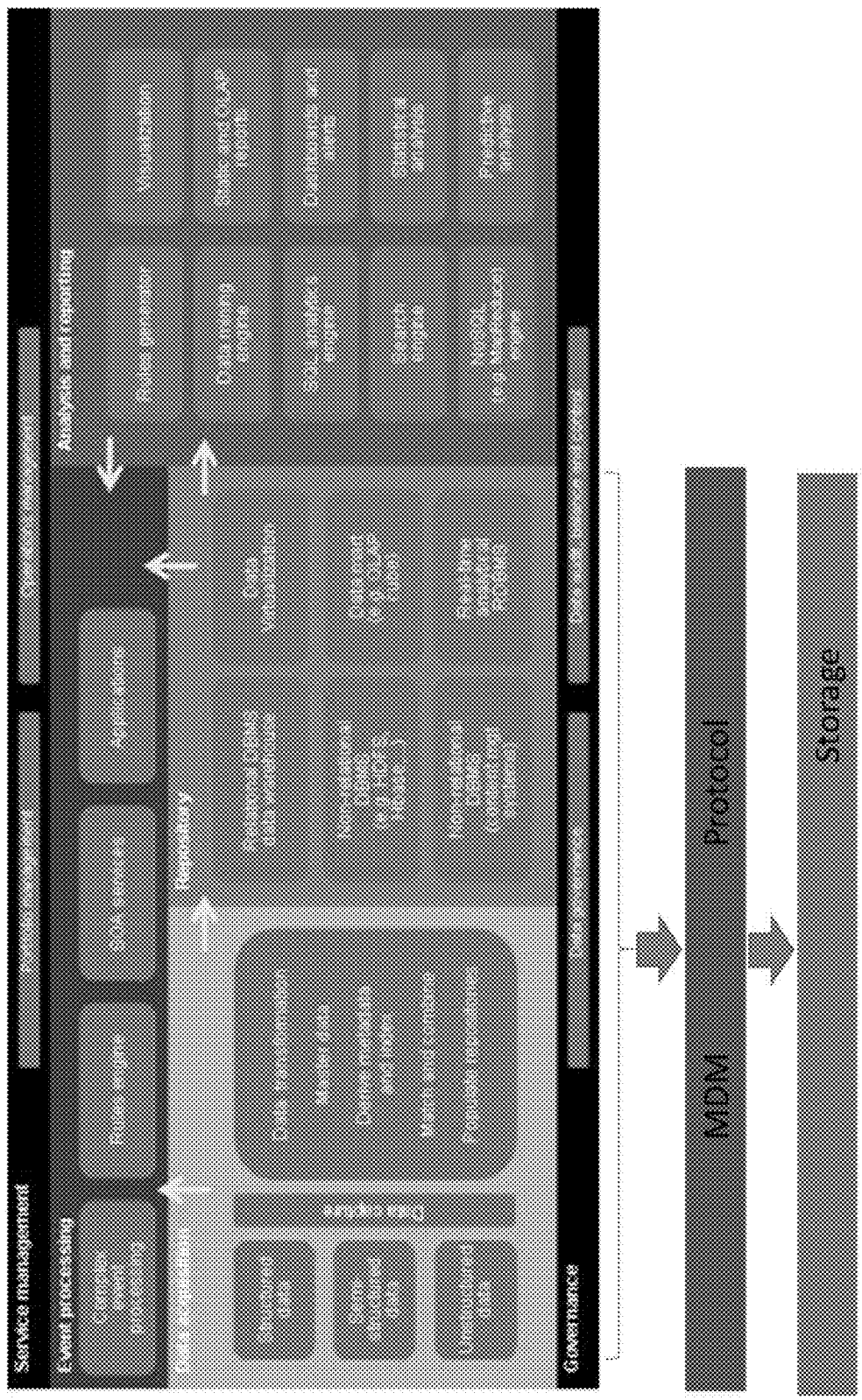
FIG. 3 illustrates an example metadata management system architecture that may perform various operations in accordance with some example embodiments described herein.

FIG. 3 illustrates an example metadata management system architecture 300 configured to perform various operations in accordance with some example embodiments described herein. In some embodiments, the example metadata management system architecture 300 may be configured to perform service management in accordance with some example embodiments described herein (e.g., as described with reference to service management circuitry 210 shown in FIG. 2). In some embodiments, the example metadata management system architecture 300 may be configured to perform event processing in accordance with some example embodiments described herein (e.g., as described with reference to event processing circuitry 212 shown in FIG. 2). In some embodiments, the example metadata management system architecture 300 may be configured to perform data acquisition in accordance with some example embodiments described herein (e.g., as described with reference to data acquisition circuitry 214 shown in FIG. 2). In some embodiments, the example metadata management system architecture 300 may be configured to perform data repository in accordance with some example embodiments described herein (e.g., as described with reference to data repository circuitry 216 shown in FIG. 2). In some embodiments, the example metadata management system architecture 300 may be configured to perform analysis and reporting in accordance with some example embodiments described herein (e.g., as described with reference to analysis and reporting circuitry 218 shown in FIG. 2). In some embodiments, the example metadata management system architecture 300 may be configured to perform governance in accordance with some example embodiments described herein (e.g., as described with reference to governance circuitry 220 shown in FIG. 2). In some embodiments, the example metadata management system architecture 300 may be configured to perform data storage in accordance with some example embodiments described herein (e.g., as described with reference to data storage circuitry 222 shown in FIG. 2). In some embodiments, the example metadata management system architecture 300 may be configured to perform blockchain data storage in accordance with some example embodiments described herein (e.g., as described with reference to blockchain data storage circuitry 224 shown in FIG. 2). In some embodiments, the example metadata management system architecture 300 may be configured to perform API functionality in accordance with some example embodiments described herein (e.g., as described with reference to API circuitry 226 shown in FIG. 2). In some embodiments, an API may be attached to all the source structure; an automatic trigger may be performed only when there is a change in a design structure or definition of the models; and messages may be sent to the server mapped with the initial structures.

Figure 4A:
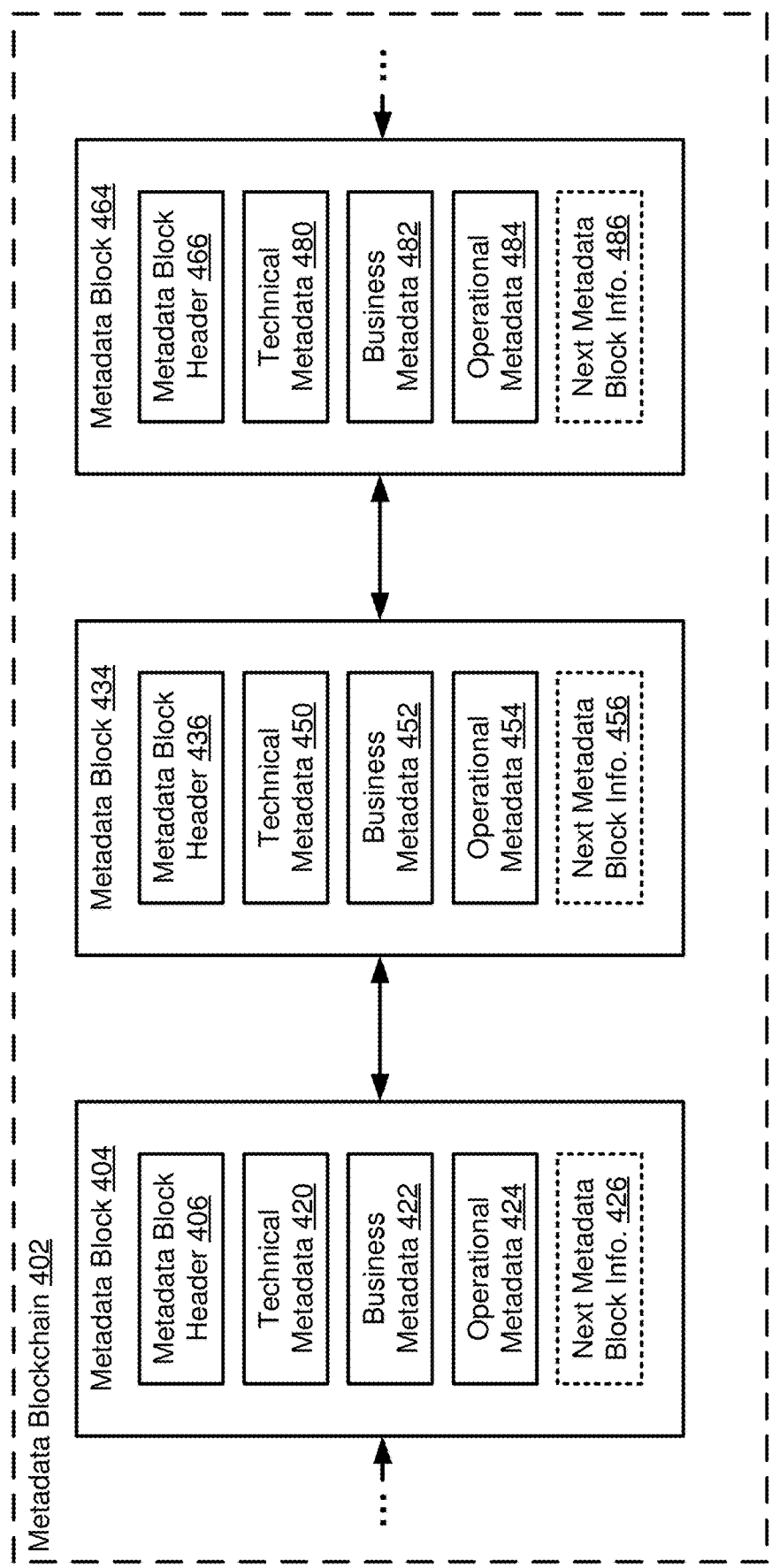
FIGS. 4A and 4B illustrate example data structures in accordance with some example embodiments described herein.
Figure 4B:
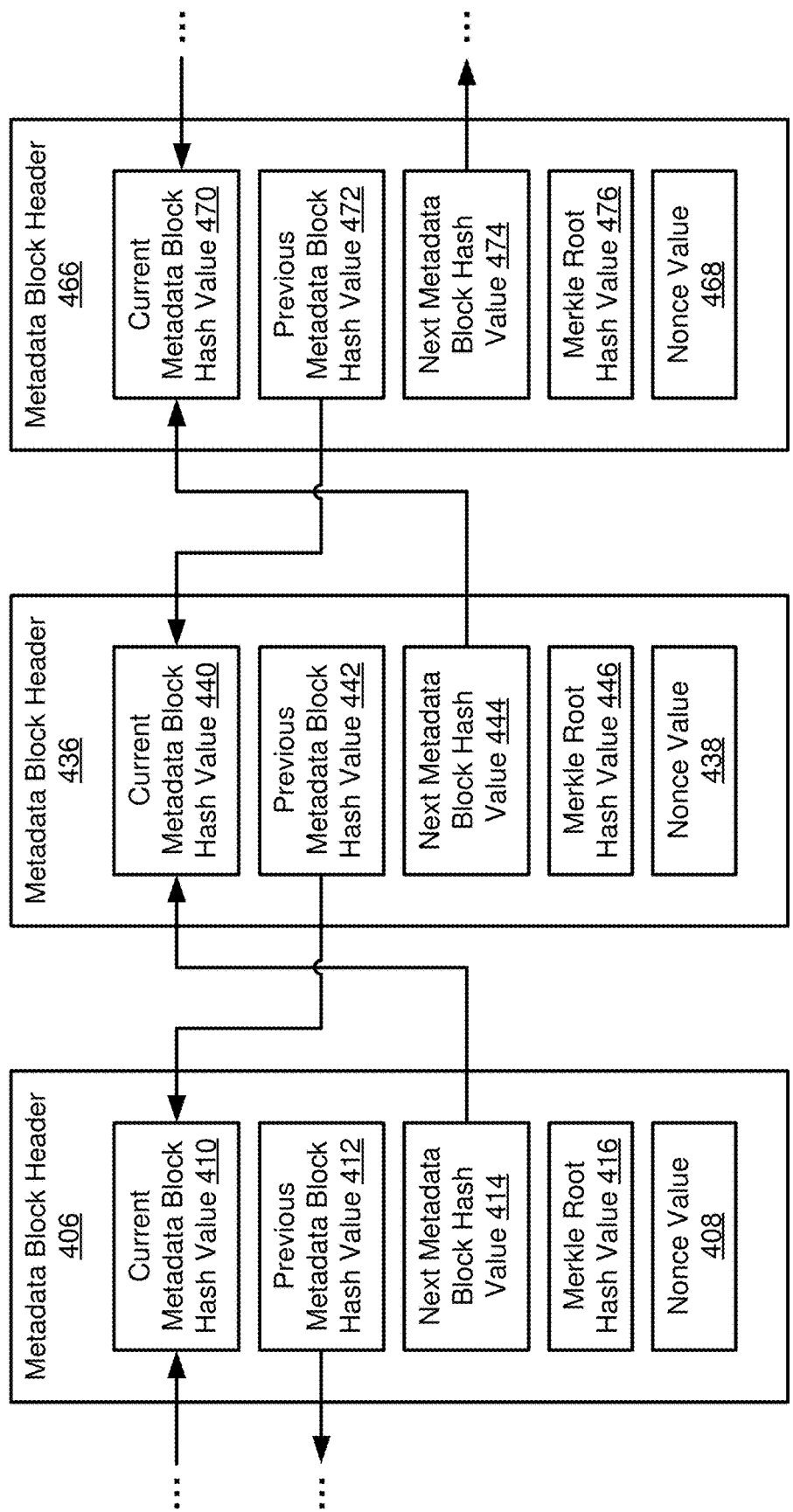

FIGS. 4A and 4B illustrate example data structures 400 and 490, respectively, in accordance with some example embodiments described herein. As shown in FIG. 4A, example data structures 400 comprise metadata blockchain 402. Metadata blockchain 402 may comprise metadata block 404, metadata block 434, and metadata block 464. As shown in FIG. 4B, example data structures 490 comprise metadata block header 406, metadata block header 436, and metadata block header 466.

As shown in FIG. 4A, metadata block 404 may comprise metadata block header 406, technical metadata 420, business metadata 422, operational metadata 424, and next metadata block information 426. As shown in FIG. 4B, metadata block header 406 may comprise current metadata block hash value 410, previous metadata block hash value 412, next metadata block hash value 414, merkle root hash value 416, and nonce value 408.

As shown in FIG. 4A, metadata block 434 may comprise metadata block header 436, technical metadata 450, business metadata 452, operational metadata 454, and next metadata block information 456. As shown in FIG. 4B, metadata block header 436 may comprise current metadata block hash value 440, previous metadata block hash value 442, next metadata block hash value 444, merkle root hash value 446, and nonce value 438.

As shown in FIG. 4A, metadata block 464 may comprise metadata block header 466, technical metadata 480, business metadata 482, operational metadata 484, and next metadata block information 486. As shown in FIG. 4B, metadata block header 466 may comprise current metadata block hash value 470, previous metadata block hash value 472, next metadata block hash value 474, merkle root hash value 476, and nonce value 468.

Figure 5:
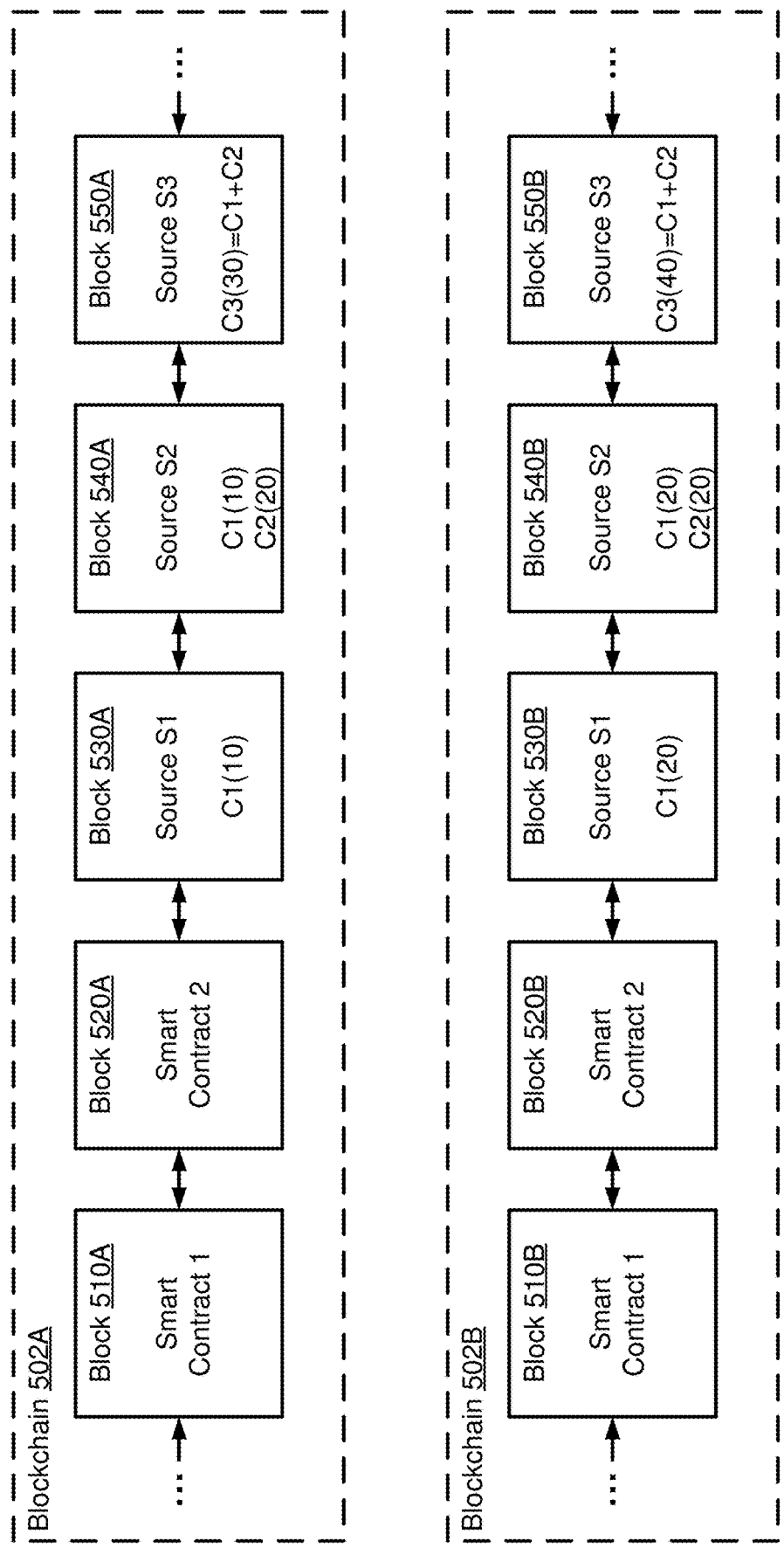
FIG. 5 illustrates example data structures in accordance with some example embodiments described herein.

FIG. 5 illustrates example data structures 500 that include data lineage data structures in the blockchain in accordance with some example embodiments described herein. In some embodiments, the example data structures 500 include the data lineage along with the verification of the data property changes with the existing data storage which may not be stored on the blockchain. The term "C(s)" refers to columns of size s. For example, the term "C1(10)" refers to a first column of size 10, the term "C2(20)" refers to a second column of size 20, and the term "C3(30)" refers to a third column of size 50, and so on. The term "S" refers to the source team which provides the details and data. For example, the term "S1" refers to a first source team, and the term "S2" refers to a second source team different from the first source team.

As shown in FIG. 5, example data structures 500 comprise blockchain 502A and blockchain 502B. In some embodiments, blockchain 502A may comprise block 510A (e.g., "Smart Contract 1"), block 520A (e.g., "Smart Contract 2"), block 530A (e.g., "Source S1," "C1(10)"), block 540A (e.g., "Source S2," "C1(10)," "C2(20)"), and block 550A (e.g., "Source S3," "C3(30)," where "C3(30)=C1(10)+ C2(20)"). In some embodiments, business logics and even the sources are stored in blockchain 502A. When there is any change in the data properties, the metadata management system may call out a smart contract to invoke the API which calls out the existing data source, then does the verification and to validate and verify the data. After the successful execution of the smart contract, the metadata management may receive the return code with the Smart Contract and perform subsequent operations as disclosed herein.

In some embodiments, blockchain 502B may comprise block 510B (e.g., "Smart Contract 1"), block 520B (e.g., "Smart Contract 2"), block 530B (e.g., "Source S1," "C1 (20)"), block 540B (e.g., "Source S2," "C1(20)," "C2(20)"), and block 550B (e.g., "Source S3," "C3(40)," where "C3 (40)=C1(20)+C2(20)"). As shown in FIG. 5, data structure "C1(20)" in block 530B in blockchain 502B indicates a change in a data structure "C1(10)" in block 530A in blockchain 502A. As a result, subsequent blocks 540B and 550B indicate changes from blocks 540A and 550A, respectively. For example, the size of the column C1 changed from 10 to 20. Once all of the parties in the chain (e.g., all of the impacted node devices) are in consensus with this change, the metadata management system may check the correctness of the data according to the data on OFF-CHAIN. The metadata management system may utilize a Smart Contract to facilitate the performance of the verification.

Figure 6:
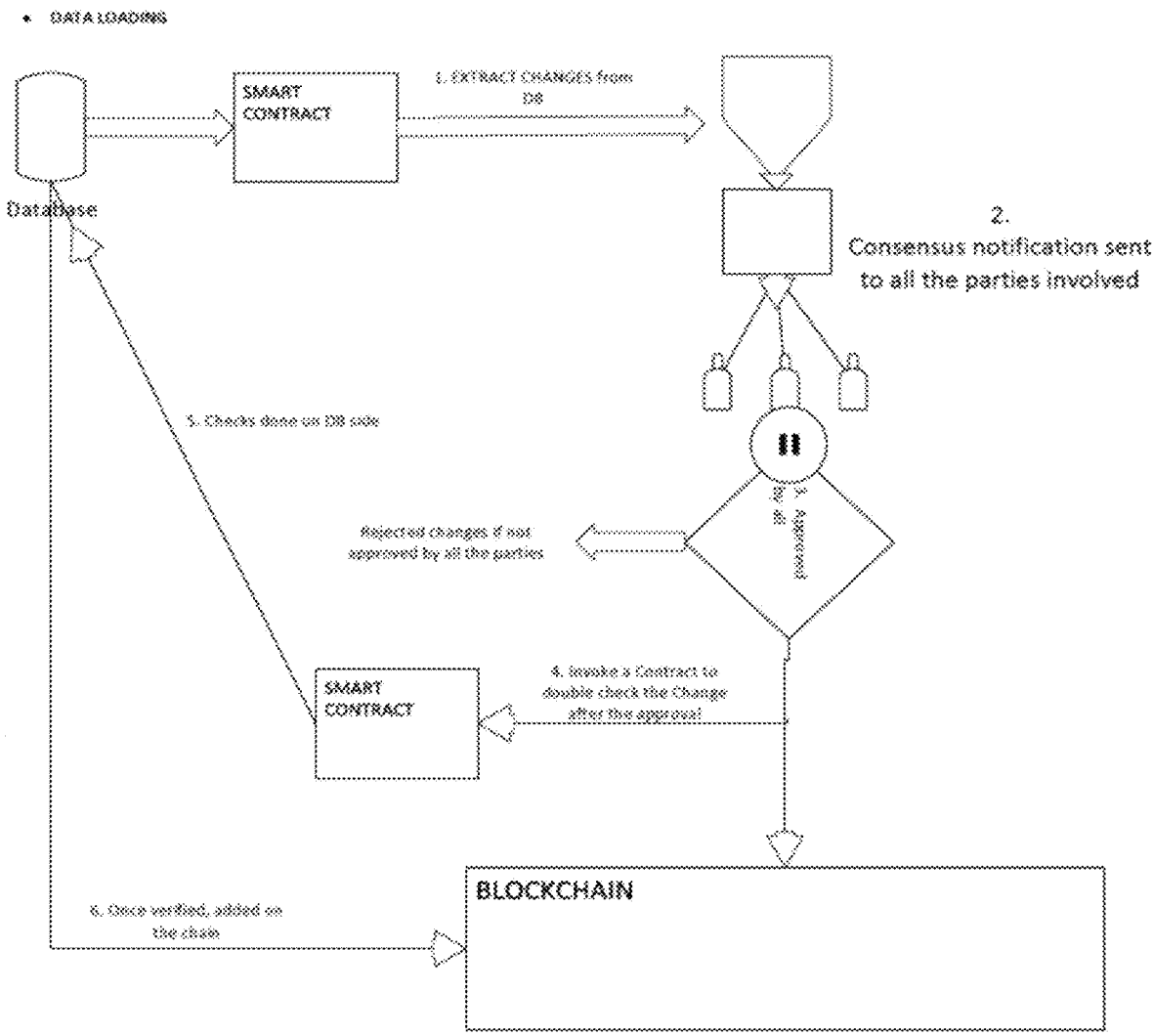
FIG. 6 illustrates an example metadata management environment in accordance with some example embodiments described herein.

FIG. 6 illustrates an example block-chain based metadata management environment 600 in accordance with some example embodiments described herein. As shown in FIG. 6, the example block-chain based metadata management environment 600 comprises data loading operations. In one illustrative embodiment, the example block-chain based metadata management environment 600 is configured to perform the following sequence of operations: (1) extract changes in a smart contract (e.g., electronic indications of changes in metadata data structures in metadata blocks in metadata blockchains); (2) send consensus notifications (e.g., metadata change consensus notification messages) to all parties involved (e.g., impacted node devices); (3) receive approvals (e.g., metadata change approval messages) from all parties involved or, if the changes are not approved by all of the parties involved, reject the changes; (4) generate a smart contract to double check the changes after receiving the approval; (5) perform checks on the database side to verify the changes (e.g., generate a metadata change validation message); and (6) once verified, add the changes on the blockchain (e.g., generate a second metadata block based on the change in the metadata data structure and add the second metadata block to the metadata blockchain). In some embodiments, the example block-chain based metadata management environment 600 may be configured to perform all, or a subset, of these operations without user input (e.g., without user interactivity).

Figure 7:
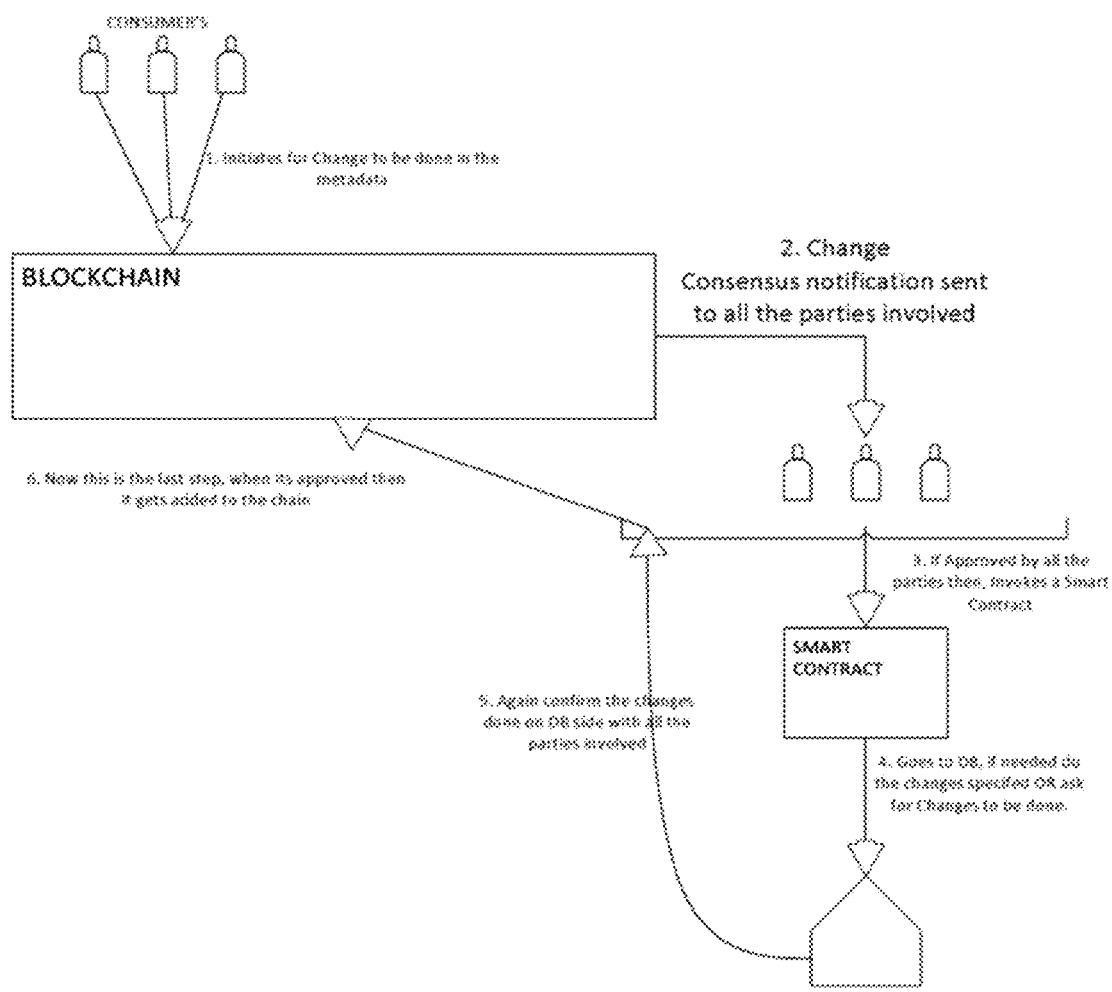
FIG. 7 illustrates an example metadata management environment in accordance with some example embodiments described herein.

FIG. 7 illustrates an example block-chain based metadata management environment 700 in accordance with some example embodiments described herein. As shown in FIG. 7, the example block-chain based metadata management environment 700 comprises data change operations that may be performed by users using client devices or by a source team (e.g., source teams changes may become the same as data loading operations shown in FIG. 6). In one illustrative embodiment, the example block-chain based metadata management environment 700 is configured to perform the following sequence of operations: (1) receive a request to initiate a change in the metadata (e.g., electronic indications of changes in metadata data structures in metadata blocks in metadata blockchains) from a computing device (e.g., a client device, a server device, a database server device, a node device); (2) send consensus notifications (e.g., metadata change consensus notification messages) to all parties involved (e.g., impacted node devices); (3) invoke a smart contract if approvals (e.g., metadata change approval messages) received from all parties involved or, if the requested changes are not approved by all of the parties involved, reject the requested changes; (4) send smart contract to a database if needed to perform the requested changes or ask for the requested changes to be performed; (5) confirm that the requested changes have been performed on the database side with all of the parties involved (e.g., generate a metadata change validation message); and (6) when approved, add the requested changes on the blockchain (e.g., generate a second metadata block based on the change in the metadata data structure and add the second metadata block to the metadata blockchain). In some embodiments, the example block-chain based metadata management environment 700 may be configured to perform all, or a subset, of these operations without user input (e.g., without user interactivity).

Having described specific components of example devices involved in the present disclosure, example procedures for providing metadata management are described below in connection with FIGS. 8 and 9.

Example Operations for Blockchain-Based Metadata Management

Figure 8:
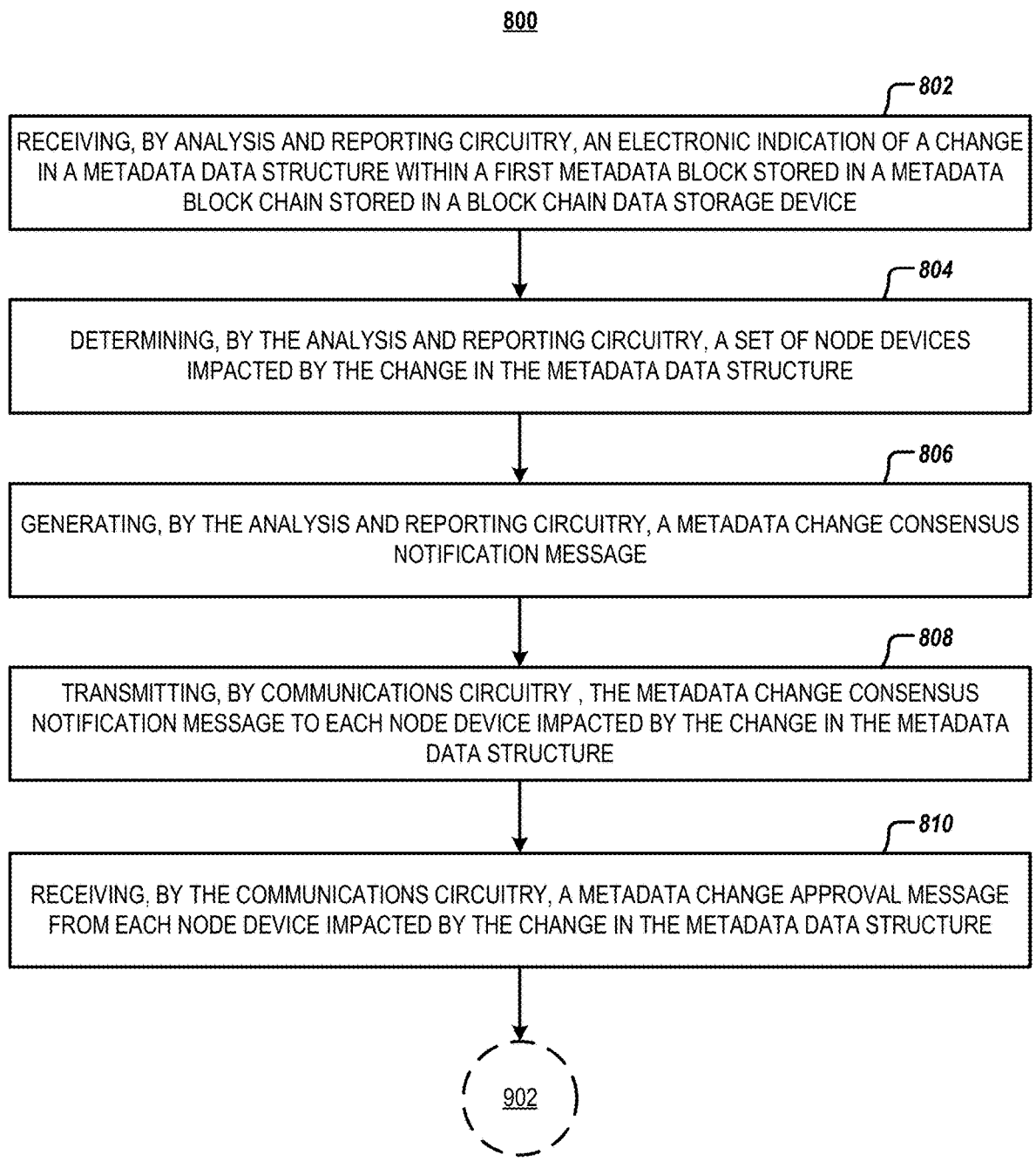
FIG. 8 illustrates an example flowchart for providing metadata management in accordance with some example embodiments described herein.

FIG. 8 illustrates an example flowchart 800 that contains example operations for providing blockchain-based metadata management in accordance with some example embodiments described herein. The operations illustrated in FIG. 8 may, for example, be performed by one or more components described with reference to metadata management system 102 shown in FIG. 1, such as a metadata management server device 104, a metadata management database 106, a server device 110, a client device 112, a database server device 114, or a user profile server device 116 in communication with metadata management system 102; by apparatus 200 shown in FIG. 2; by metadata management system architecture 300 shown in FIG. 3; or by any combination thereof. In some embodiments, the various operations described in connection with FIG. 8 may be performed by the apparatus 200 by or through the use of one or more of processing circuitry 202, memory 204, input-output circuitry 206, communications circuitry 208, service management circuitry 210, event processing circuitry 212, data acquisition circuitry 214, data repository circuitry 216, analysis and reporting circuitry 218, governance circuitry 220, data storage circuitry 222, blockchain data storage circuitry 224, API circuitry 226, any other suitable circuitry, and any combination thereof.

As shown by operation 802, the apparatus 200 includes means, such as analysis and reporting circuitry 218 or the like, for receiving an electronic indication of a change in a metadata data structure within a first metadata block stored in a metadata blockchain stored in a blockchain data storage device. In some embodiments, the apparatus 200 may receive the electronic indication of the change in the metadata data structure as described in more detail with reference to FIGS. 1-7.

As shown by operation 804, the apparatus 200 includes means, such as the analysis and reporting circuitry 218 or the like, for determining a set of node devices impacted by the change in the metadata data structure. In some embodiments, the apparatus 200 may determine the set of impacted node devices as described in more detail with reference to FIGS. 1-7.

As shown by operation 806, the apparatus 200 includes means, such as the analysis and reporting circuitry 218 or the like, for generating a metadata change consensus notification message. In some embodiments, the apparatus 200 may generate the metadata change consensus notification message as described in more detail with reference to FIGS. 1-7.

As shown by operation 808, the apparatus 200 includes means, such as communications circuitry 208 or the like, for transmitting the metadata change consensus notification message to each impacted node device in the set of impacted node devices. In some embodiments, the apparatus 200 may transmit the metadata change consensus notification message to each impacted node device as described in more detail with reference to FIGS. 1-7.

As shown by operation 810, the apparatus 200 includes means, such as communications circuitry 208 or the like, for receiving a metadata change approval message from each node device impacted by the change in the metadata data structure. In some embodiments, the apparatus 200 may receive the metadata change approval message from each node device impacted by the change in the metadata data structure as described in more detail with reference to FIGS. 1-7.

In some embodiments, operations 802, 804, 806, 808, and 810 may not necessarily occur in the order depicted in FIG. 8, and in some cases one or more of the operations depicted in FIG. 8 may occur substantially simultaneously, or additional steps may be involved before, after, or between any of the operations shown in FIG. 8. Optionally, after operation 810, the flowchart 800 may proceed to operation 902 discussed with reference to FIG. 9.

Figure 9:
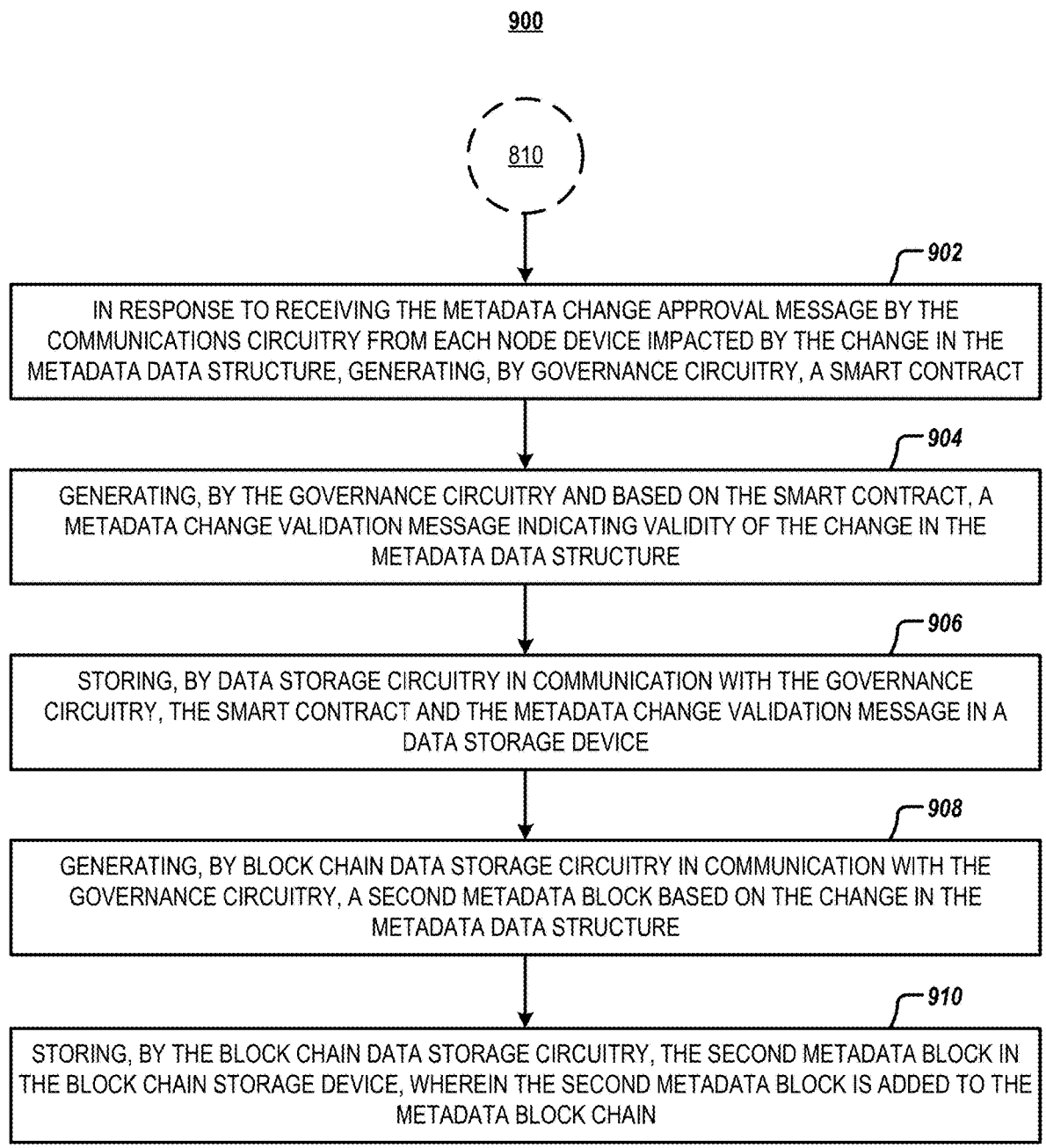
FIG. 9 illustrates an example flowchart for providing metadata management in accordance with some example embodiments described herein.

FIG. 9 illustrates an example flowchart 900 that contains example operations for providing blockchain-based metadata management in accordance with some example embodiments described herein. The operations illustrated in FIG. 9 may, for example, be performed by one or more components described with reference to metadata management system 102 shown in FIG. 1, such as a metadata management server device 104, a metadata management database 106, a server device 110, a client device 112, a database server device 114, or a user profile server device 116 in communication with metadata management system 102; by apparatus 200 shown in FIG. 2; by metadata management system architecture 300 shown in FIG. 3; or by any combination thereof. In some embodiments, the various operations described in connection with FIG. 9 may be performed by the apparatus 200 by or through the use of one or more of processing circuitry 202, memory 204, input-output circuitry 206, communications circuitry 208, service management circuitry 210, event processing circuitry 212, data acquisition circuitry 214, data repository circuitry 216, analysis and reporting circuitry 218, governance circuitry 220, data storage circuitry 222, blockchain data storage circuitry 224, API circuitry 226, any other suitable circuitry, and any combination thereof.

As shown by operation 902, the apparatus 200 includes means, such as governance circuitry 220 or the like, for generating a smart contract in response to receiving the metadata change approval message by the communication circuitry from each node device impacted by the change in the metadata data structure. In some embodiments, the apparatus 200 may generate the smart contract as described in more detail with reference to FIGS. 1-7.

As shown by operation 904, the apparatus 200 includes means, such as governance circuitry 220 or the like, for generating, based on the smart contract, a metadata change validation message indicating validity of the change in the metadata data structure. In some embodiments, the apparatus 200 may generate the metadata change validation message as described in more detail with reference to FIGS. 1-7.

As shown by operation 906, the apparatus 200 includes means, such as data storage circuitry 222 or the like, for storing the smart contract and the metadata change validation message in a data storage device. In some embodiments, the apparatus 200 may storing the smart contract as described in more detail with reference to FIGS. 1-7.

As shown by operation 908, the apparatus 200 includes means, such as blockchain data storage circuitry 224 or the like, for generating a second metadata block based on the change in the metadata data structure and in response to generating (e.g., by the governance circuitry 220) the smart contract and the metadata change validation message. In some embodiments, the apparatus 200 may generate the second metadata block as described in more detail with reference to FIGS. 1-7.

As shown by operation 910, the apparatus 200 includes means, such as blockchain data storage circuitry 224 or the like, for storing the second metadata block in the blockchain storage device, wherein the second metadata block is added to the metadata blockchain by the blockchain data storage circuitry. In some embodiments, the apparatus 200 may store the second metadata block as described in more detail with reference to FIGS. 1-7.

In some embodiments, operations 902, 904, 906, 908, and 910 may not necessarily occur in the order depicted in FIG. 9, and in some cases one or more of the operations depicted in FIG. 9 may occur substantially simultaneously, or additional steps may be involved before, after, or between any of the operations shown in FIG. 9.

As noted above, methods, apparatuses, systems, and computer program products are described herein that provide blockchain-based metadata management. By doing so, users of client devices are able to avoid the traditional problems surrounding metadata management. For instance, through performance of the above operations, a user can avoid multiple interactions with a client device to maintain a metadata management database. Further, example embodiments described herein provide metadata management in a faster, cheaper, and less resource and data intensive manner. For instance, example embodiments described herein facilitate and streamline the process of identifying and validating changes in metadata so that the user may more quickly and easily maintain a metadata management database. Moreover, in some embodiments, example embodiments described herein provide technological improvements to existing metadata management systems by facilitating the performance of multiple operations in real-time and without user interactivity, including, but not limited to: automatically tracking metadata data structures; automatically identifying changes in metadata data structures; generating electronic indications of changes in metadata data structures; determining sets of impacted node devices; generating metadata change consensus notification messages; generating control signals configured to cause communications circuitry to transmit metadata change consensus notification messages to each impacted node device; generating smart contracts; generating metadata change validation messages based on smart contracts; storing smart contracts in data storage devices; generating metadata blocks based on changes in metadata data structures; and storing metadata blocks in blockchain storage devices. Further, the example embodiments described herein may be used to provide improved metadata management or for any other suitable purpose, such as for data management, smart contract management, financial currency management, regulatory reports, audit processes, and in all business units to perform automatic lineage tracking and dependency management. Accordingly, these and other embodiments described herein at least: reflect improvements in the functioning of computing systems or devices, such as metadata management systems (including but not limited to metadata management server devices and databases), server devices, client devices, and combinations thereof; reflect improvements to other technologies or technical fields as described herein; and effect transformations or reductions of particular articles to different states or things, such as metadata data structures, metadata blocks, metadata blockchains, other articles described herein, and combinations thereof.

FIGS. 8 and 9 thus illustrate flowcharts describing the operation of various systems (e.g., metadata management system 102 described with reference to FIG. 1, metadata management system architecture 300 described with reference to FIG. 3), apparatuses (e.g., apparatus 200 described with reference to FIG. 2), methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 8 and 9 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated drawings. Although the drawings only show certain components of the apparatuses and systems described herein, it is understood that various other components may be used in conjunction with the apparatuses and systems described herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for blockchain-based metadata management, the computing system comprising:
   analysis and reporting circuitry configured to
      receive an electronic indication of a change in a metadata data structure within a first metadata block stored in a metadata blockchain stored in a blockchain data storage device,
      determine a plurality of node devices impacted by the change in the metadata data structure, and
      generate a metadata change consensus notification message comprising a notification or alert of the change in the metadata data structure within the first metadata block stored in the metadata blockchain;
   communications circuitry configured to
      transmit the metadata change consensus notification message to each impacted node device in the plurality of impacted node devices, and
      receive a metadata change approval message from each node device impacted by the change in the metadata data structure;
   governance circuitry configured to
      validate the change in the metadata data structure via generation of a smart contract in response to receiving the metadata change approval message from each node device impacted by the change in the metadata data structure, wherein the smart contract verifies the change in the metadata data structure has occurred in a data storage external to the metadata blockchain to validate the change in the metadata data structure;
      generate, based on the smart contract, a metadata change validation message indicating validity of the change in the metadata data structure; and
   blockchain data storage circuitry configured to
      in response to generation by the governance circuitry of the smart contract and the metadata change validation message, generate a second metadata block comprising the change in the metadata data structure, and
      store the second metadata block in the blockchain data storage device, wherein the second metadata block is added to the metadata blockchain by the blockchain data storage circuitry.

2. The computing system of claim 1, wherein the analysis and reporting circuitry is further configured to:
   receive the electronic indication of the change in the metadata data structure from a node device.

3. The computing system of claim 1, wherein the analysis and reporting circuitry is further configured to:
   extract, from the blockchain data storage device, the electronic indication of the change in the metadata data structure.

4. The computing system of claim 1, wherein the analysis and reporting circuitry is further configured to:

automatically track the metadata data structure in real-time and without user interactivity; automatically identify the change in the metadata data structure in real-time and without user interactivity; and generate the electronic indication of the change in the metadata data structure in real-time and without user interactivity.

5. The computing system of claim 1, wherein the analysis and reporting circuitry is further configured to:

determine the plurality of impacted node devices in real-time and without user interactivity; and generate the metadata change consensus notification message in real-time and without user interactivity.

6. The computing system of claim 1, wherein the analysis and reporting circuitry is further configured to:

generate, in real-time and without user interactivity, a control signal configured to cause the communications circuitry to transmit the metadata change consensus notification message to each impacted node device in the plurality of impacted node devices.

7. The computing system of claim 1, wherein the governance circuitry is further configured to:

generate the smart contract in real-time and without user interactivity; and generate the metadata change validation message based on the smart contract in real-time and without user interactivity.

8. The computing system of claim 1, further comprising data storage circuitry configured to:

store the smart contract in a first data storage device in real-time and without user interactivity; and store the metadata change validation message in a second data storage device in real-time and without user interactivity.

9. The computing system of claim 1, wherein the blockchain data storage circuitry is further configured to:

generate the second metadata block without user interactivity; and store the second metadata block in the blockchain data storage device in real-time and without user interactivity.

10. The computing system of claim 1, wherein the blockchain data storage circuitry is further configured to:

generate the second metadata block based on a cryptographic hash technique.

11. The computing system of claim 10, wherein the blockchain data storage circuitry is further configured to:

generate the second metadata block using a cryptographic hash algorithm.

12. The computing system of claim 1, wherein the electronic indication of the change in the metadata data structure is a data structure.

13. The computing system of claim 1, wherein the change in the metadata data structure comprises a change in data of the first metadata block.

14. The computing system of claim 1, wherein the change in the metadata data structure comprises a change in a model definition in the first metadata block.

15. The computing system of claim 1, wherein the change in the metadata data structure comprises an addition of a model definition to the first metadata block.

16. The computing system of claim 1, wherein the change in the metadata data structure comprises a change in a technical metadata data structure.

17. The computing system of claim 1, wherein the change in the metadata data structure comprises a change in a business metadata data structure.

18. The computing system of claim 1, wherein the change in the metadata data structure comprises a change in an operational metadata data structure.

19. A computer-implemented method for blockchain-based metadata management, the computer-implemented method comprising:

receiving, by analysis and reporting circuitry, an electronic indication of a change in a metadata data structure within a first metadata block stored in a metadata blockchain stored in a blockchain data storage device;

determining, by the analysis and reporting circuitry, a plurality of node devices impacted by the change in the metadata data structure;

generating, by the analysis and reporting circuitry, a metadata change consensus notification message comprising a notification or alert of the change in the metadata data structure within the first metadata block stored in the metadata blockchain;

transmitting, by communications circuitry, the metadata change consensus notification message to each impacted node device in the plurality of impacted node devices;

receiving, by the communications circuitry, a metadata change approval message from each node device impacted by the change in the metadata data structure; and in response to receiving the metadata change approval message by the communications circuitry from each node device impacted by the change in the metadata data structure:

generating, by governance circuitry, a smart contract to validate the change in the metadata data structure;

generating, by the governance circuitry and based on the smart contract, a metadata change validation message indicating validity of the change in the metadata data structure;

validating the change in the metadata data structure via generation of a smart contract in response to receiving the metadata change approval message from each node device impacted by the change in the metadata data structure, wherein the smart contract verifies the change in the metadata data structure has occurred in a data storage external to the metadata blockchain to validate the change in the metadata data structure; and storing a second metadata block in the blockchain data storage device, wherein the second metadata block includes the change in the metadata data structure.

20. A computer program product for blockchain-based metadata management, the computer program product comprising at least one non-transitory computer-readable storage medium storing computer-executable program code instructions that, when executed by a computing apparatus, cause the computing apparatus to:

receive, by analysis and reporting circuitry, an electronic indication of a change within a metadata data structure stored in a first metadata block in a metadata blockchain stored in a blockchain data storage device;

determine, by the analysis and reporting circuitry, a plurality of node devices impacted by the change in the metadata data structure;

generate, by the analysis and reporting circuitry, a metadata change consensus notification message comprising a notification or alert of the change in the metadata data structure within the first metadata block stored in the metadata blockchain;

transmit, by communications circuitry, the metadata change consensus notification message to each impacted node device in the plurality of impacted node devices;

receive, by the communications circuitry, a metadata change approval message from each node device impacted by the change in the metadata data structure;

validate the change in the metadata data structure via generation of a smart contract in response to receiving the metadata change approval message from each node device impacted by the change in the metadata data structure, wherein the smart contract verifies the change in the metadata data structure has occurred in a data storage external to the metadata blockchain to validate the change in the metadata data structure;

generate, based on the smart contract, a metadata change validation message;

in response to generation of the smart contract and the metadata change validation message, generate, by blockchain data storage circuitry, a second metadata block comprising the change in the metadata data structure; and store, by the blockchain data storage circuitry, the second metadata block in the blockchain data storage device, wherein the second metadata block is added to the metadata blockchain by the blockchain data storage circuitry.

* * * * *